US011358593B2

(12) United States Patent
Alzaydi et al.

(10) Patent No.: US 11,358,593 B2
(45) Date of Patent: Jun. 14, 2022

(54) DUAL DIRECTION ACCIDENT PREVENTION AND ASSISTIVE BRAKING SYSTEM

(71) Applicant: King Fahd University of Petroleum and Minerals, Dhahran (SA)

(72) Inventors: Ammar Ayad Alzaydi, Dhahran (SA); Abdulmohsen Albasri, Dhahran (SA); Anas Mohammad Almuhaizea, Dhahran (SA); Ibrahim Saud Alzakari, Dhahran (SA); Abdullah Alshabanah, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 374 days.

(21) Appl. No.: 16/506,514

(22) Filed: Jul. 9, 2019

(65) Prior Publication Data

US 2021/0009112 A1 Jan. 14, 2021

(51) Int. Cl.
*B60W 30/09* (2012.01)
*B60T 7/12* (2006.01)
(Continued)

(52) U.S. Cl.
CPC ......... *B60W 30/09* (2013.01); *B60R 21/0132* (2013.01); *B60T 7/12* (2013.01);
(Continued)

(58) Field of Classification Search
CPC .......... B60W 30/09; B60W 2554/804; B60W 2554/801; B60W 2420/50;
(Continued)

(56) References Cited

U.S. PATENT DOCUMENTS

| 3,876,033 | A | 4/1975 | Shore |
| 4,066,230 | A | 1/1978 | Nohmi et al. |

(Continued)

FOREIGN PATENT DOCUMENTS

| CN | 100347012 C | 11/2007 |
| CN | 107344552 A | 11/2017 |

(Continued)

OTHER PUBLICATIONS

Coelingh, et al. ; Collision Warnign With Auto Brake—A Real-Life Safety Perspective ; Volvo Car Corporation ; Paper No. 07-0450 ; 9 Pages.

(Continued)

*Primary Examiner* — Ig T An
(74) *Attorney, Agent, or Firm* — Oblon, McClelland, Maier & Neustadt, L.L.P.

(57) ABSTRACT

A dual direction accident prevention (DDAP) and assistive braking system (ABS) which detects both the risk of a frontal accident and a rear accident and then coordinates braking to prevent both if possible while giving priority to preventing a frontal accident. In the event of an imminent rear collision with an object or vehicle in front of a driver, the system will choose a braking force which minimizes the impact of the rear collision, while determining a safe approach toward the front obstacle. Furthermore, if a vehicle is approaching the driver and an accident is imminent, and there is no further room in front to reduce the effect of the imminent impact, the system prepares the vehicle and driver by bracing for impact by applying emergency brakes, tightening seatbelts, etc.

19 Claims, 15 Drawing Sheets

(51) Int. Cl.
*B60R 21/0132* (2006.01)
*B60T 8/172* (2006.01)
*B60R 21/36* (2011.01)
*B60R 21/01* (2006.01)
*B60R 21/232* (2011.01)

(52) U.S. Cl.
CPC ............ *B60T 8/172* (2013.01); *B60R 21/232* (2013.01); *B60R 21/36* (2013.01); *B60R 2021/01211* (2013.01); *B60R 2021/01259* (2013.01); *B60R 2021/01272* (2013.01); *B60T 2210/32* (2013.01); *B60W 2420/50* (2013.01); *B60W 2420/52* (2013.01); *B60W 2554/801* (2020.02); *B60W 2554/804* (2020.02); *B60W 2710/182* (2013.01); *B60W 2710/30* (2013.01)

(58) Field of Classification Search
CPC ....... B60W 2420/52; B60W 2710/182; B60W 2710/30; B60R 21/0132; B60R 21/232; B60R 21/36; B60R 2021/01211; B60R 2021/01259; B60R 2021/01272; B60T 7/12; B60T 8/172; B60T 2210/32
See application file for complete search history.

(56) References Cited

U.S. PATENT DOCUMENTS

| | | |
|---|---|---|
| 4,893,691 A | 1/1990 | Park |
| 5,170,858 A | 12/1992 | Chen |
| 5,278,764 A | 1/1994 | Iizuka et al. |
| 5,410,484 A | 4/1995 | Kunimi et al. |
| 5,631,639 A | 5/1997 | Hibino et al. |
| 5,684,474 A | 11/1997 | Gilon et al. |
| 5,727,854 A | 3/1998 | Pueschel et al. |
| 6,002,329 A | 12/1999 | Marks |
| 6,278,360 B1 | 8/2001 | Yanagi |
| 6,388,580 B1 | 5/2002 | Graham |
| 6,433,679 B1 | 8/2002 | Schmid |
| 6,523,912 B1 | 2/2003 | Bond, III et al. |
| 6,607,255 B2 | 8/2003 | Bond, III et al. |
| 6,831,572 B2 | 12/2004 | Strumolo et al. |
| 7,035,735 B2 | 4/2006 | Knoop et al. |
| 7,061,374 B2 | 6/2006 | Waterman |
| 7,200,481 B2 | 4/2007 | Yamamura et al. |
| 7,253,724 B2 | 8/2007 | Prakah-Asante et al. |
| 7,495,550 B2 | 2/2009 | Huang et al. |
| 7,668,633 B2 | 2/2010 | Diebold et al. |
| 7,673,950 B2 | 3/2010 | Fulks et al. |
| 7,894,951 B2 | 2/2011 | Norris et al. |
| 8,126,626 B2 | 2/2012 | Zagorski |
| 8,150,583 B2 | 4/2012 | Danner et al. |
| 8,260,538 B2 | 9/2012 | Noda et al. |
| 8,694,222 B2 | 4/2014 | Zagorski |
| 8,738,264 B1 | 5/2014 | Yopp et al. |
| 8,903,620 B2 | 12/2014 | Hammoud et al. |
| 9,156,354 B2 | 10/2015 | Rossi et al. |
| 9,205,815 B2 | 12/2015 | Hammoud et al. |
| 9,428,163 B2 | 8/2016 | Breuer et al. |
| 10,991,242 B2 * | 4/2021 | Taylor ...................... H04Q 9/00 |
| 2003/0111902 A1 | 6/2003 | Thiede et al. |
| 2005/0046272 A1 | 3/2005 | Kieth et al. |
| 2006/0028065 A1 | 2/2006 | Thiede et al. |
| 2007/0265760 A1 | 11/2007 | Konhauser et al. |
| 2012/0300072 A1 | 11/2012 | Kim |
| 2014/0309884 A1 * | 10/2014 | Wolf ..................... B60W 10/04 701/41 |
| 2015/0346337 A1 | 12/2015 | Jung |
| 2016/0272172 A1 | 9/2016 | Lee |
| 2017/0050627 A1 | 2/2017 | Lee |
| 2017/0136842 A1 * | 5/2017 | Anderson .............. B60N 2/501 |
| 2017/0248949 A1 | 8/2017 | Moran et al. |
| 2018/0037227 A1 * | 2/2018 | D'sa ..................... B60W 30/16 |
| 2018/0114440 A1 | 4/2018 | Malla |
| 2020/0114815 A1 * | 4/2020 | Massengill ............ B60Q 1/503 |

FOREIGN PATENT DOCUMENTS

| | | |
|---|---|---|
| DE | 102 20 566 A | 11/2003 |
| EP | 0 549 909 B1 | 8/1996 |
| EP | 2 407 356 A1 | 1/2012 |
| EP | 1 942 026 B1 | 7/2013 |
| EP | 2 902 291 A1 | 8/2015 |
| JP | 2548082 | 9/1997 |
| JP | 2722746 | 3/1998 |
| JP | 2765329 | 6/1998 |
| JP | 2007-25782 | 2/2007 |
| JP | 4142750 B2 | 9/2008 |
| KR | 10-2017-0086895 | 7/2017 |
| WO | 01/14184 A1 | 3/2001 |
| WO | 2006/053667 A1 | 5/2006 |

OTHER PUBLICATIONS

Pololu ; Stepper Motors ; https://www.pololu.com/category/87/stepper-motors ; May 29, 2019 ; 14 Pages.

Wei, et al. ; LiDar and Camera Detection Fusion in a Real-Time Industrial Multi-Sensor Collision Avoidance System ; MDPI Electronics 7,84 ; 2018 ; 32 Pages.

Quanergy ; 360 Degree 3D LiDar M8-1 Sensor ; Quanergy Systems, Inc. ; 2015 ; 2 Pages.

* cited by examiner

DUAL DIRECTION ACCIDENT PREVENTION AND ASSISTIVE BRAKING SYSTEM

BACKGROUND

Technical Field

The present disclosure is directed to a system and methods for dual direction accident prevention (DDAP) and assistive braking (ABS).

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Present vehicle accident prevention technology monitors the distance between a subject vehicle and vehicles in front or back and brakes automatically in the event the front vehicle stops or slows down and the driver fails to react on time.

U.S. Pat. No. 6,278,360 B1, incorporated herein by reference in its entirety, describes a vehicle collision warning system having cameras for monitoring vehicles in front of and behind a subject vehicle. The system takes action to alert the vehicles of the situation. The alert has warning and action levels and may be in the form of tightening a seatbelt.

U.S. 2012/0300072 A1, incorporated herein by reference in its entirety, describes a collision warning and avoidance system using multiple cameras to monitor situations around a vehicle in sectors. Detection of other vehicles in the sector is monitored by the computer to determine if an approaching vehicle is causing a dangerous situation. This system may operate the brakes with varying degrees of force, deploy protective equipment on the vehicle or employ a collision dampening system in response to the detection of an imminent collision. The protective equipment may include a magnetic bumper which repels a corresponding magnetic bumper on another vehicle. Exterior airbags on a bumper may be employed for mitigation of impact.

U.S. 2017/0248949 A1, incorporated herein by reference in its entirety, describes a radar system for autonomous vehicles which monitors the positions of vehicles directly in front and directly in back of a subject vehicle. When the system detects an imminent accident, a warning is sent to the other vehicles and an attempt is made to avoid the accident. Each vehicle may autonomously steer, change velocities and/or brake to avoid or reduce the impact of a collision.

Previous attempts to avoid collisions have failed to coordinate avoidance of both a front and rear collision, while giving priority to avoidance of the front collision.

Aspects of the present disclosure describe a system that detects both the risk of a frontal accident and a rear accident and coordinates braking to prevent both if possible while giving the priority to prevention of a frontal accident. In the event of an imminent rear collision with an object in front of a driver, the system will choose the braking force that minimizes the impact (shock) of the rear collision, while determining a safe approach toward the front obstacle. Furthermore, if the system detects a vehicle approaching the driver and an accident is imminent, and there is no further room in front to reduce the effect of the imminent impact, then the system prepares the vehicle and driver for such event (bracing for impact by applying emergency brakes, tightening seatbelts, employing interior or exterior airbags, employing electromagnetic fields on bumpers, dropping side or rear curtain airbags, etc.)

SUMMARY

In an exemplary embodiment, a dual direction accident prevention (DDAP) system for a first vehicle is described, comprising a dual direction rate of approach monitor (DDRA) including a front rate of approach monitor (FRAM) and a rear rate of approach monitor (RRAM), wherein the FRAM monitors and determines in near-real time both a distance of a second vehicle from a front of the first vehicle, df, and a rate of approach of the front of the first vehicle towards the second vehicle, vr_f, and the RRAM monitors and determines in near-real time both a distance of a third vehicle from a rear of the first vehicle, dr, and a rate of approach of the third vehicle towards the rear of the first vehicle, vr_r; an assistive braking processor configured for receiving the front and rear rate of approach determinations in parallel and near-simultaneously from the FRAM and the RRAM, correlating the determinations, and generating a braking signal, an assistive braking controller configured for receiving the braking signal and applying a first braking force to a brake pedal actuator when the rate of approach of the first vehicle towards the second vehicle is greater than a first threshold, wherein the first braking force is based on both the remaining distance between the first vehicle and the second vehicle, and the rate of approach of the third vehicle.

In another exemplary embodiment, a method of dual direction accident prevention (DDAP) is described, comprising monitoring in near-real time, by a dual direction rate of approach monitor (DDRA), both a distance of a second vehicle from a front of a first vehicle, df, and a rate of approach of the front of the first vehicle towards the second vehicle, vr_f, monitoring both a distance of a third vehicle from a rear of the first vehicle, dr, and a rate of approach of the third vehicle towards the rear of the first vehicle, vr_r; receiving, by an assistive braking processor, the front and rear rate of approach determinations in parallel and near-simultaneously from the DDRA, correlating the determinations and generating a braking signal, receiving, by an assistive braking controller, the braking signals and applying a first braking force to a brake pedal actuator when the rate of approach of the first vehicle towards the second vehicle is greater than a first threshold, wherein the first braking force is based on both the remaining distance between the first vehicle and the second vehicle, and the rate of approach of the third vehicle.

In another exemplary embodiment, a non-transitory computer readable medium having instructions stored therein that, when executed by one or more processor, cause the one or more processors to perform a method of dual direction accident prevention (DDAP), comprising monitoring in near-real time, by a dual direction rate of approach monitor (DDRA), both a distance of a second vehicle from a front of a first vehicle, df, and a rate of approach of the front of the first vehicle towards the second vehicle, vr_f, monitoring both a distance of a third vehicle from a rear of the first vehicle, dr, and a rate of approach of the third vehicle towards the rear of the first vehicle, vr_r, receiving, by an assistive braking processor, the front and rear rate of approach determinations in parallel and near-simultaneously from the DDRA, correlating the determinations, and generating a braking signal, and receiving, by an assistive braking controller, the braking signal and applying a first braking force to a brake pedal actuator when the rate of approach of the first vehicle towards the second vehicle is greater than a first threshold, wherein the first braking force is based on both the remaining distance between the first vehicle and the second vehicle, and the rate of approach of the third vehicle.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
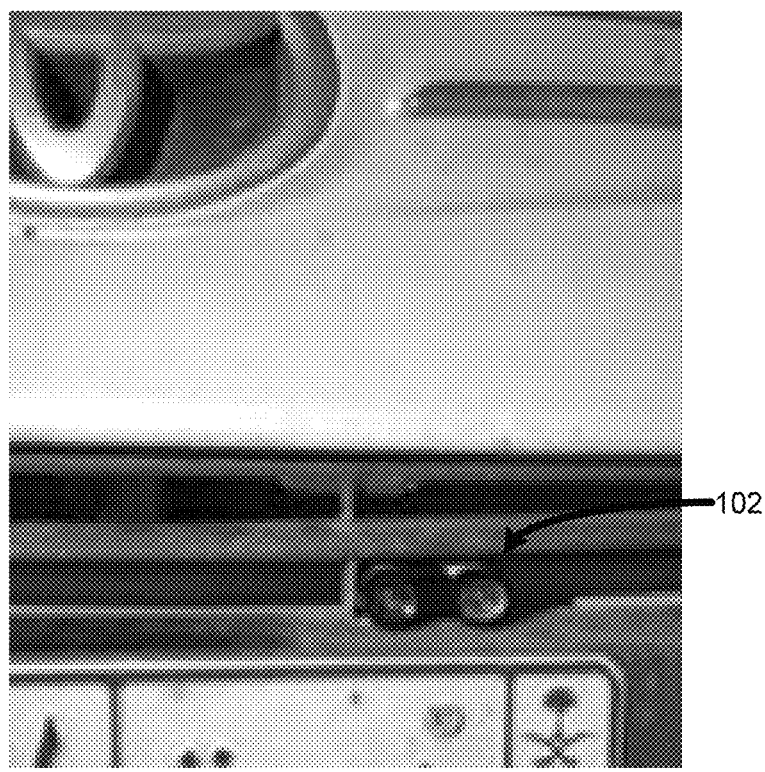
FIG. 1A illustrates the position of the LiDAR cameras on the front of a vehicle.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

The term "near real-time" or "nearly real-time" (NRT), in telecommunications and computing, refers to the time delay introduced, by automated data processing or network transmission, between the occurrence of an event and the use of the processed data, such as for display or feedback and control purposes. As used in the present disclosure, near-real time refers to a time delay of less than or equal to one second.

Aspects of this disclosure are directed to a dual direction accident prevention (DDAP) system for a first vehicle, a method of dual direction accident prevention (DDAP) and a non-transitory computer readable medium having instructions stored therein that, when executed by one or more processors, cause the one or more processors to perform a method of dual direction accident prevention (DDAP).

Aspects of the present disclosure describe the dual direction accident prevention (DDAP) and assistive braking system (ABS) which detects both the risk of a frontal accident and a rear accident in near-real time and then coordinates braking to prevent both if possible while giving priority to preventing a frontal accident. In the event of an imminent rear collision with an object or vehicle in front of a driver, the system will choose a braking force which minimizes the impact (shock) of the rear collision, while determining a safe approach toward the front obstacle. Furthermore, if the system detects a vehicle approaching the driver and an accident is imminent, and there is no further room in front to reduce the effect of the imminent impact, the system may prepare the vehicle and driver for such event (bracing for impact by applying emergency brakes, tightening seatbelts, employing interior or exterior airbags, employing electromagnetic fields on bumpers, etc.).

The system monitors both front and rear distances from other moving and stationary vehicles and, in addition, monitors the front and rear rate of approach of other vehicles to the driver's vehicle.

If the assistive braking system detects the driver's vehicle is approaching an obstacle or a vehicle in front of it at too high of a rate of speed, it will apply the brakes while considering not just the remaining distance between driver and front vehicle but also the rate of approach of any vehicle from behind.

If there is no vehicle behind the driver then the system will automatically brake to avoid a frontal accident at the safest distance possible between the driver and the car in front.

If there is a vehicle approaching from behind the driver and the driver is approaching a vehicle from the front, the system will take four measurements, (1) distance from front vehicle, (2) distance from rear vehicle, (3) rate of approach to front vehicle, (4) rate of approach of rear vehicle and then choose the safest rate of automatic braking to avoid collision from both the front and rear.

The system will initially slow down the subject vehicle quickly to avoid an accident with the front vehicle while monitoring the approach of the rear vehicle. Thereafter, the rate of braking by the automated braking system may vary in order to allow the rear vehicle time to stop/slow down as well and avoid a rear accident.

Priority is given to avoiding a frontal accident, therefore, if an imminent accident is determined from the rear, the system will minimize the effect of the rear accident by minimizing the braking while avoiding the frontal accident.

In summary, the system will not just avoid a frontal accident; it will adjust avoidance of a frontal accident if there is a possibility of a rear accident to try and avoid both. However, if a minimum frontal distance is reached between driver and front obstacle, the system priority is to avoid frontal accidents and minimize the effect of rear collisions.

The system also monitors the rear rate of approach of other vehicles. If a vehicle approaching from behind is determined to be likely to have an imminent accident with the driver and there is sufficient space in front of the driver to avoid the frontal accident; the system will prevent additional braking by the driver of the subject vehicle to minimize the effects of rear impact, and avoid it if possible.

In addition to controlling the braking of the driver to minimize imminent rear collision, the system also can tighten the seatbelts of the passengers and use other available vehicle safety features to prepare for an impact. The system can signal airbags to prepare for an accident, increase the magnetic field on an exterior electromagnetic bumper or apply emergency brakes. Curtain airbags can be deployed that drop down in front of the rear seats or on the sides.

If there is no danger of hitting an obstacle in front, the system prevents the driver from braking in order to avoid a rear collision with a vehicle approaching from the rear.

The system can be an add-on to a vehicle or integrated during the car manufacturing stage.

Figure 1B:
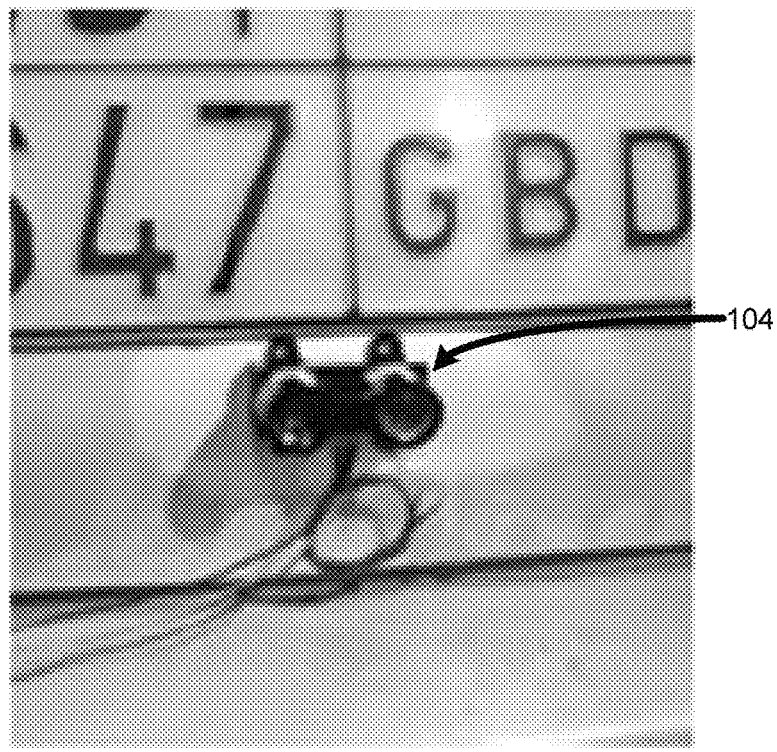
FIG. 1B illustrates the position of the LiDAR cameras on the rear of a vehicle.

The dual direction accident prevention system (DDAP) employs LiDAR cameras to take position measurements. As shown in FIG. 1A, a front scanning LiDAR camera 102 is installed on the approximate center of the front grill above the front license plate. FIG. 1B depicts the installation of a rear scanning LiDAR camera 104 on the rear lower approximate center of a vehicle below the rear license plate.

Preferably the cameras project outwardly from the surface of the vehicle. For example, the cameras are not flush with the surface of the vehicle. In a preferable embodiment, the cameras are located at a height that is higher than the center of gravity of the vehicle and more preferably are located at a distance from the ground that is approximately equal to the center of gravity of an individual driving the vehicle. Cameras that are located in a position that are relatively high, above the center of gravity of the automobile, and have lenses that project from the surface of the vehicle are able to better focus and direct light for the purpose of imaging objects.

LiDAR uses ultraviolet, visible, or near infrared light to image objects. A LiDAR camera is an active sensor, which can work regardless of the natural illumination, such as at night or in moderate fog or rain. LiDAR uses active sensors that supply their own illumination source. The energy source hits objects and the reflected energy is detected and measured by photosensors. The camera is linked to a LiDAR detector including data processing circuitry. The distance to the object is determined by recording the time between transmitted and backscattered pulses and by using the speed of light to calculate the distance traveled.

Photosensors that function to detect light emitted by the cameras are preferably located at various heights at both the front and rear ends of the vehicle. Preferably photosensors are located both below, at and above the center of gravity of the vehicle. In a preferable embodiment photosensors are present on a front flat surface of the vehicle and are also embedded in the windshield of the vehicle.

The maximum speed of the vehicle(s) is estimated to be no more than 5 m per second (about 130 mph). In order to have enough reaction time for collision avoidance, the detection frequency needs to be 5 Hz or above.

Figure 2:
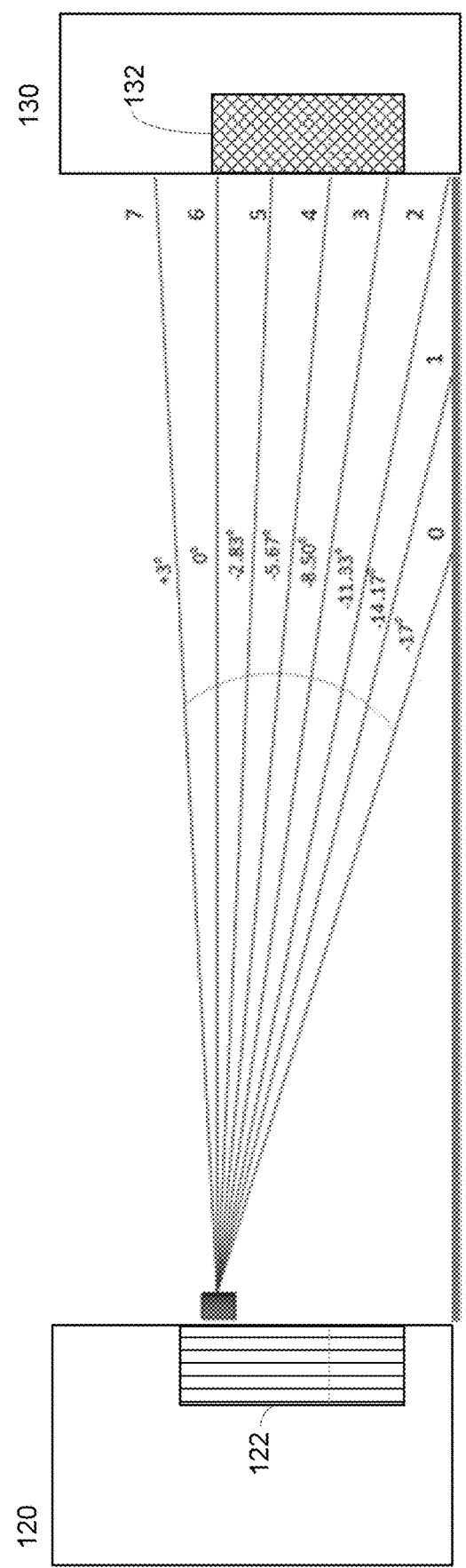
FIG. 2 illustrates the light paths of an eight beam LiDAR camera.

The front and rear cameras may be eight beam LiDAR cameras. The beam number represents in which beam the returned point is located. The LiDAR cameras each transmit eight beams. The beam numbers are shown in FIG. 2. Assuming the LiDAR is mounted parallel to the plane of the ground, Beam 7 is the top beam and is aimed upward approximately 3 degrees apart from Beam 6, which points horizontally and parallel to the road surface. Each subsequent beam is spaced approximately 3 degrees apart from each adjacent beam.

In a non-limiting example, the eight beam LiDAR detector may be the 360 degree 3D LiDAR M8-1 sensor manufactured by Quanergy Systems, Inc., 482 Mercury Drive, Sunnyvale, Calif. 94085, USA.

The vehicle may also include proprioceptive sensors, including wheel speed, steering angle, throttle position, engine control unit (ECU), two brake pressure sensors and an inertial measurement unit (IMU). These sensors allow the vehicle actuation and feedback control system to interpret the output of the system dual direction accident prevention system and send commands to the ECU to control throttle and braking. Proprioceptive sensors are included in many newer vehicles.

Figure 3A:
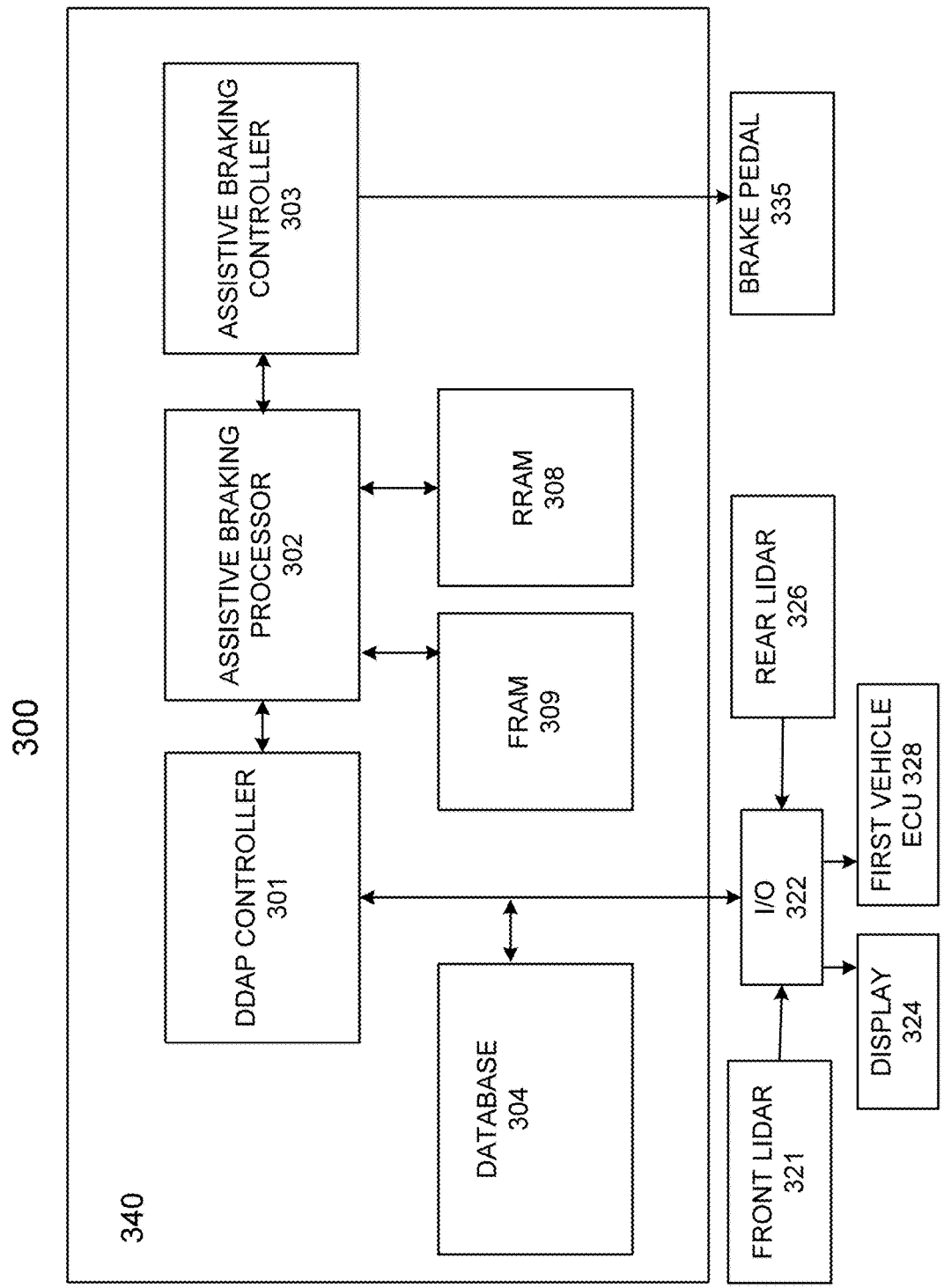
FIG. 3A illustrates an overview of the DDAP control system.

LiDAR measurements are received by the dual direction rate of approach monitor (DDRA) 340, which is now described with respect to FIG. 3A. A front LiDAR camera 321 and a rear LiDAR camera 326 take measurements which are transmitted to a DDAP controller 301 through I/O port 322. The dual direction accident prevention controller 301 is connected to assistive braking 302. 302 is connected to a front rate of approach monitor (FRAM) 309 and a rear rate of approach monitor (RRAM) 308. Calculations made within the FRAM and RRAM are sent from the assistive braking processor to an assistive braking controller 303, which controls brake pedal 335 based on the calculations. The DDAP controller is connected to a display, which may be an in-vehicle display, for notifying a driver of the status of the approach of vehicles before and in the rear of the first vehicle. Additionally, the display may depict images of the surrounding vehicles. The controller may also connect to an electronic control unit (ECU) of the first vehicle which controls vehicle features, such as airbags, emergency brakes, notifications, etc.

A first embodiment is illustrated with respect to FIG. 3A, FIG. 4 and FIG. 6A-6C. The first embodiment describes a dual direction accident prevention (DDAP) system 300 for a first vehicle 620, the DDAP comprising a dual direction rate of approach monitor (DDRA) 340 including a front rate of approach monitor (FRAM) and a rear rate of approach monitor (RRAM), wherein the FRAM monitors and determines in near-real time both a distance of a second vehicle 630 from a front of the first vehicle, df, and a rate of approach of the front of the first vehicle towards the second vehicle, vr_f, and the RRAM monitors and determines in near-real time both a distance of a third vehicle 640 from a rear of the first vehicle, dr, and a rate of approach of the third vehicle towards the rear of the first vehicle, vr_r. The DDAP includes an assistive braking 302 configured for receiving the front and rear rate of approach determinations in parallel and near-simultaneously from the FRAM and the RRAM, correlating the determinations, and generating a braking signal. The assistive braking system connected to an assistive braking controller 303. The assistive braking controller is configured for receiving the braking signal and applying a first braking force to a brake pedal actuator (594, 598 and motor, FIG. 5D) when the rate of approach of the first vehicle towards the second vehicle is greater than a first threshold. The first braking force is based on both the remaining distance between the first vehicle 620 and the second vehicle 630, and the rate of approach of the third vehicle 640.

If the assistive braking processor does not detect a third vehicle behind the first vehicle and the rate of approach of the first vehicle towards the second vehicle is greater than the first threshold, the assistive braking controller automatically applies braking to the first vehicle at a second braking force which prevents a collision between the first vehicle and the second vehicle in front of the first vehicle.

If the assistive braking processor does not detect a third vehicle behind the first vehicle, and the rate of approach of the first vehicle towards the second vehicle is greater than second threshold, the assistive braking controller 303 automatically applies braking to the first vehicle at a braking force which minimizes the impact of a collision between the first vehicle and the second vehicle and the DDAP controller signals a vehicle controller (ECU 328) to brace a driver and passengers of the first vehicle to withstand the impact.

Bracing is one or more of applying secondary brakes, tightening a seatbelt, employing at least one of an interior and an exterior airbag, employing an electromagnetic fields on a bumper, dropping a side curtain airbag and dropping a rear curtain airbag. The driver and/or passengers may also be notified by the display or an alarm that a collision is imminent.

The second braking force is greater than the first braking force, wherein the first braking force is partial braking and the second braking force is full braking. Partial braking refers to a certain amount of braking force applied to the brake pedal in addition to the amount of braking force applied by a driver. Full braking refers to full control by the DDAP system, wherein the driver may not operate the brake pedal.

The first vehicle further comprises a front LiDAR detector and a rear LiDAR detector, wherein the dual direction rate of approach monitor (DDRA) receives measurements from the LiDAR detectors.

If the RRAM detects a third vehicle approaching from behind the first vehicle and the first vehicle is approaching the second vehicle, the assistive braking processor correlates four different inputs to control the braking. The four different inputs are (i) the distance between the front of the first vehicle and the rear of the second vehicle, (ii) the distance between the rear of the first vehicle and the front of the third vehicle, (iii) the rate of approach of the first vehicle towards the second vehicle and (vi) the rate of approach of the third vehicle towards the first vehicle, wherein the assistive brake system determines the force of the automatic braking for the first vehicle to avoid collision with the second vehicle while reducing the danger that the third vehicle will collide with the rear of the first vehicle.

Alternatively, if the rate of approach of the third vehicle is greater than a second threshold, the assistive braking controller applies the force of the automatic braking for the first vehicle to avoid collision with the second vehicle and the assistive braking system signals a vehicle controller to brace a driver and passengers of the first vehicle to withstand impact from the third vehicle.

The front rate of approach, $vr\_f$, is calculated by dividing the difference between two consecutive distance readings of df, by the amount of time between the readings, and the rear rate of approach, $vr\_r$, is calculated by dividing the difference between two consecutive distance readings of dr, by the amount of time between the readings.

A time of braking to avoid an accident with the second vehicle, $tb\_f$, is determined by the assistive braking processor by dividing a current reading of df by a previous calculation of the front rate of approach, $vr\_f$, and comparing the time of braking to a first braking threshold and a second braking threshold, where the first braking threshold is greater than the second braking threshold.

If $tb\_f$ is greater than the first braking threshold, the braking force is zero.

If $tb\_f$ is less than or equal to the first braking threshold and greater than the second threshold, the assistive braking controller applies partial braking.

If $tb\_f$ is less than or equal to the second braking threshold, the assistive braking controller applies full braking.

A time of braking to avoid a collision by the third vehicle, $tb\_r$, is determined by the assistive braking processor by dividing a current reading of dr by a previous calculation of the rear rate of approach, $vr\_r$, and comparing the time of braking to a first braking threshold and a second braking threshold, wherein the first braking threshold is greater than the second braking threshold.

If $tb\_r$ is greater than the first braking threshold, the braking force is zero, if $tb\_r$ is less than or equal to the first braking threshold and greater than the second threshold, the assistive braking controller applies partial braking, and if $tb\_r$ is less than or equal to the second braking threshold, the assistive braking controller applies full braking.

The second embodiment is illustrated with respect to FIG. 3A, FIG. 4 and FIG. 6A-6C. The second embodiment describes a method of dual direction accident prevention (DDAP), comprising monitoring in near-real time, by a dual direction rate of approach monitor (DDRA) 340, both a distance of a second vehicle 630 from a front of a first vehicle 620, df, and a rate of approach of the front of the first vehicle towards the second vehicle, $vr\_f$, monitoring both a distance of a third vehicle 640 from a rear of the first vehicle, dr, and a rate of approach of the third vehicle towards the rear of the first vehicle, $vr\_r$, receiving, by an assistive braking 302, the front and rear rate of approach determinations in parallel and near-simultaneously from the DDRA, correlating the determinations, and generating a braking signal. The method continues by applying, by an assistive braking controller 303 configured for receiving the braking signal, a first braking force to a brake pedal actuator (594, 598 and motor, FIG. 5D) when the rate of approach of the first vehicle towards the second vehicle is greater than a first threshold, wherein the first braking force is based on both the remaining distance between the first vehicle and the second vehicle, and the rate of approach of the third vehicle.

The method continues by determining, by the assistive braking processor, whether the rate of approach of the first vehicle towards the second vehicle is greater than a second threshold and whether the rate of approach of the third vehicle towards the first vehicle is greater than a third threshold, and applying braking to avoid a collision with the second vehicle while bracing a driver and passengers of the first vehicle to withstand an impact from the third vehicle, wherein bracing is one or more of applying emergency brakes, tightening seatbelts, employing interior or exterior airbags, employing electromagnetic fields on bumpers, dropping side curtain airbags and dropping rear curtain airbags.

A third embodiment is illustrated with respect to FIG. 3A, FIG. 4 and FIG. 6A-6C. The third embodiment describes a non-transitory computer readable medium having instructions stored therein that, when executed by one or more processors, cause the one or more processors to perform a method of dual direction accident prevention (DDAP), comprising monitoring in near-real time, by a dual direction rate of approach monitor (DDRA), both a distance of a second vehicle from a front of a first vehicle, df, and a rate of approach of the front of the first vehicle towards the second vehicle, vr_f, monitoring both a distance of a third vehicle from a rear of the first vehicle, dr, and a rate of approach of the third vehicle towards the rear of the first vehicle, vr_r, receiving, by an assistive braking system, the front and rear rate of approach determinations in parallel and near-simultaneously from the DDRA, correlating the determinations, and generating a braking signal; receiving, by an assistive braking controller, the braking signal and applying a first braking force to a brake pedal actuator (594, 598 and motor, FIG. 5D) when the rate of approach of the first vehicle towards the second vehicle is greater than a first threshold, wherein the first braking force is based on both the remaining distance between the first vehicle and the second vehicle, and the rate of approach of the third vehicle.

Figure 3B:
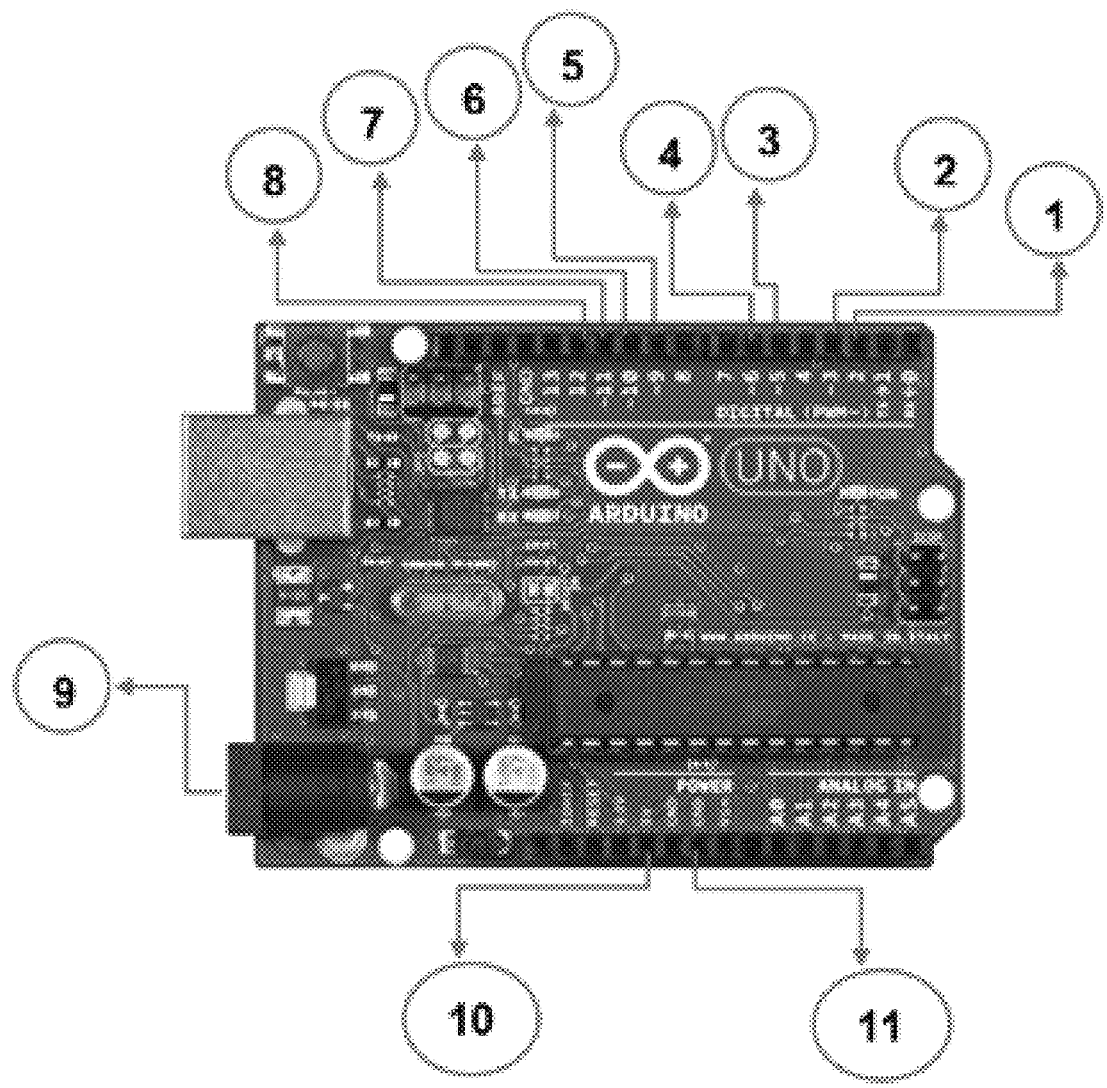
FIG. 3B illustrates a circuit board showing the pin contacts.

A prototype monitor was assembled using Arduino IDE software with C++ programing language. Arduino consists of both a physical programmable circuit board (often referred to as a microcontroller) and a piece of software, or IDE (Integrated Development Environment) that runs on a computer, and which is used to write and upload computer code to the physical board. An illustration of an Arduino board showing labelled pins is shown in FIG. 3B.

The pins are labelled as shown in Table I.

TABLE I

Pin Layout for Circuit Board

| Number | Description |
|---|---|
| 1 | Pin 2 - Trigger pin on microcontroller for front sensor |
| 2 | Pin 3 - Monitoring pin on microcontroller for front sensor |
| 3 | Pin 5 - Trigger pin on microcontroller for rear sensor |
| 4 | Pin 6 - Monitoring pin on microcontroller for rear sensor |
| 5 | Pin 9 - linear servo data connection |
| 6 | Pin 10 - LED # 3 |
| 7 | Pin 11 - LED # 2 |
| 8 | Pin 12 - LED # 1 |
| 9 | Barrell connector - Microcontroller 12 V Power supply |
| 10 | 5 V Pin - Power (+) connection for front and rear sensors |
| 11 | Ground Pin - Ground (-) connection for front and rear sensors |

Libraries and symbols used in the software are shown in Table II.

TABLE II

List of Symbols andShortcuts

| | |
|---|---|
| df | Current Front Distance Reading in (m) |
| dr | Current Rear Distance Reading in (m) |
| df_1 | Initial Front Distance Reading in (m) |
| dr_1 | Initial Rear Distance Reading in (m) |
| tb_f | Time to Brake Before Crashing into the Front Vehicle in (s) |
| tb_r | Time for the Rear Vehicle to Brake Before Crashing the User Vehicle in (s) |
| vr_f | Relative Velocity Between the User Vehicle and the Front Vehicle in (m/s) |
| vr_r | Relative Velocity Between the User Vehicle and the Rear Vehicle in (m/s) |

The variables used and the input and output pins are now described. The symbols df_1 and dr_1 are the initial values at start-up. The symbols df and dr represent new values that the position sensors read in each cycle. Before entering the main loop, 100 readings per second were collected from the each LiDAR using a FOR loop and then averaged to reduce the error percentage as shown in code lines 40-51 below.

After the values of df and dr enter pins 3 and 6, the values are divided by 10 to convert the reading unit from mm to cm, and are then displayed in the Serial Monitor window (2) for checking and testing.

When the IF statement condition in line 60 is satisfied, vr_f is calculated by taking the difference between the current and previous (or initial) front distance values and dividing by the time between these two readings (in this case 1 second).

In line 63, tb_f is calculated by dividing df by the previously found value for vr_f.

If the IF statement condition in line 65 is satisfied then vr_r and tb_r are calculated in the same manner as were vr_f and tb_f.

If the IF condition in line 70 is satisfied, then there are three possible results. For Case 1 (line 72), only the first LED will light, in Case 2 (line 79) both the first and second LEDs will light, and in Case 3 (line 87) all the three LEDs will light.

The system sets an upper threshold of 10 seconds as the maximum amount of time available to stop the vehicle, and a lower threshold of 5 seconds for the maximum time partial braking is feasible. Below 5 seconds of available braking time, the system initiates only full braking force. In line 97, the system checks whether tb_f≤10 s, i.e, the time available for braking between the first vehicle and a second vehicle in front is less than or equal to 10 seconds. If the condition of line 97 is met, there are two possible situations, either 10 s≥tb_f>5 s, which will initiate partial braking, or tb_f≤5 s which will initiate full braking.

If the conditions in line numbers 70 and 97 are satisfied, then both a second front vehicle and a third rear vehicle have been detected. If only condition number 70 was met, then only a third rear vehicle was detected.

When the IF statement condition in line 65 is not satisfied, the code passes to line 114, and checks whether this condition is satisfied (in this case there is a front car only). There are two cases, either 15 s≥tb_f>5 s which will initiate relative partial braking, or tb_f≤5 s which will initiate full braking.

If the IF statement condition in line 60 is not satisfied, the process advances to the condition in line 131, and checks whether it is satisfied (in this case there is only a third (rear) vehicle). Here the system will determine if tb_r, such that 15 s≥tb_r>5 s initiates relative partial braking, or tb_r≤5 s initiates full braking as done for steps 70 to 95.

If neither one of the conditions in line number 70, 114 and 131 is satisfied, the system does not change the braking conditions.

Lines 167 to line 182 represent the variables displayed after each cycle in the Serial Monitor window for checking and testing.

Before the system takes new readings, the values of df and dr are assigned for df_1 and dr_1 as old readings (lines 187 and 188). The delay function (1000) in line 189 causes the process to wait 1 second before taking a new reading and the loop is closed in line 190.

The system code and calculations are:

```
1    #include <Servo.h>
2    #include <Wire.h>
3    #include <LIDARLite.h>
4
5    Servo myservo;
6
7    unsigned long df; unsigned long dr;
8    double df_1 = 4001,dr_1= 4001;
9    double tb_f, tb_r, vr_f, vr_r;
10   init val;
11
12   void setup ( )
13   {
14
15       Serial.begin(115200); // Start serial communications
16
17       myservo.attach(9);
18
19       // Set pin 2 & 5 as trigger pin , Set trigger LOW for continuous read
20       pinMode(2, OUTPUT);
21       digitalWrite(2, LOW);
22
23       pinMode(5, OUTPUT);
24       digitalWrite(5, LOW);
25
26       // Set pin 3 & 6 as monitor pin
27       pinMode(3, INPUT);
28       pinMode(6, INPUT);
29
30       // Set pin 12, 11, 10 as output for LED's
31       pinMode(12, OUTPUT);
32       pinMode(11, OUTPUT);
33       pinMode(10, OUTPUT);
34   }
35
36   void loop( )
37   {
38
39       double df_av = 0; double dr_av = 0;
40       for(int i = 0;i<10;){
41           df = pulseIn(3, HIGH);
42           dr = pulseIn(6, HIGH);
43           df_av = df_av + df;
44           dr_av = dr_av + dr;
45           i = i + 1;
46           delay(100);
47       }
48       df_av = df_av / 100;
49       dr_av = dr_av / 100;
50       df = df_av;
51       dr = dr_av;
52   // ----------------------------------------------------------
53       if(df != 0){
54           df = df / 10; // 10usec = 1 cm of distance
55       }
56       if(dr != 0){
57           dr = dr / 10; // 10usec = 1 cm of distance
58       }
59   //----------------------------------------------------------
60       if ( df != 0 && df < 4001 ){
61
62           vr_f = ( df − df_1 )/( 1 ); vr_f = abs(vr_f);
63           tb_f = df / vr_f; tb_f = abs(tb_f);
64
65           if( dr != 0 ){
66
67               vr_r = ( dr − dr_1 )/( 1 ); vr_r = abs(vr_r);
68               tb_r = dr / vr_r; tb_r= abs(tb_r);
69
70               if( tb_r <= 10 ){
71
72                   if( tb_r > 7 ){
73                       digitalWrite(12, HIGH);
74                   }
75                   else {
76                           digitalWrite(12, LOW);
77                       }
78
79                   if( tb_r > 5 && tb_r <= 7 ){
```

```
80                  digitalWrite(12, HIGH);
81                  digitalWrite(11, HIGH);
82              }
83                  else {
84                      digitalWrite(11, LOW);
85                  }
86
87              if( tb_r <= 5 ){
88                  digitalWrite(12, HIGH);
89                  digitalWrite(11, HIGH);
90                  digitalWrite(10, HIGH);
91              }
92                  else {
93                      digitalWrite(10, LOW);
94                  }
95          }
96
97              if( tb_f <= 10 ){
98
99                  if( tb_f > 5 ){
100                     val = tb_f;
101                     val = map(val, 5, 10, 90, 10);
102                     myservo.write(val);
103                 }
104                 else {
105                         val = tb_f;
106                         val = map(val, tb_f, 10, 90, 10);
107                         myservo.write(val);
108                     }
109
110         }
111
112     }
113
114             if( tb_f <= 15 && (tb_r > 10 || tb_r == 0) ){
115
116                 if( tb_f > 5 ){
117                     val = tb_f;
118                     val = map(val, 5, 10, 90, 10);
119                     myservo.write(val);
120                 }
121                 else {
122                 val = tb_f;
123                 val = map(val, tb_f, 10, 90, 10);
124                 myservo.write(val);
125                 }
126
127             }
128
129     }
130 //---------------------------------------------------------
131             if( dr != 0 && dr < 4001){
132
133             vr_r = ) dr − dr_1 )/( 0.25 ); vr_r = abs(vr_r);
134             tb_r = dr / vr_r; tb_r= abs(tb_r);
135
136         if( tb_r <= 10 ){
137
138             if( tb_r > 7 ){
139                 digitalWrite(12, HIGH);
140             }
141                 else {
142                     digitalWrite(12, LOW);
143                 }
144
145             if( tb_r > 5 && tb_r <= 7 ){
146                 digitalWrite(12, HIGH);
147                 digitalWrite(11, HIGH);
148             }
149                 else {
150                     digitalWrite(11, low);
151                 }
152
153             if( tb_r <= 5 ){
154                 digitalWrite(12, HIGH);
155                 digitalWrite(11, HIGH);
156                 digitalWrite(10, HIGH);
157             }
158                 else {
```

```
159                         digitalWrite(10, LOW);
160                     }
161
162                 }
163
164             }
165     //-----------------------------------------------------
166     // display data gathered from sensors and show calculated parameters
167     Serial.print("tb front:");
168     Serial.println(tb_f);
169     Serial.print("tb rear:");
170     Serial.println(tb_r);
171     Serial.print("front:");
172     Serial.println(df_1);
173     Serial.print("new front:");
174     Serial.println(df);
175     Serial.print("rear:");
176     Serial.println(dr_1);
177     Serial.print("new rear:");
178     Serial.println(dr);
179     Serial.print("vr front:");
180     Serial.println(vr_f);
181     Serial.print("vr rear:");
182     Serial.println(vr_r);
183     Serial.print("-----------------------------------------------------");
184     Serial.print("\n");
185
186     // reassign values
187         df_1 = df;
188         dr_1 = dr;
189         delay(1000);
190 }
```

Figure 4:
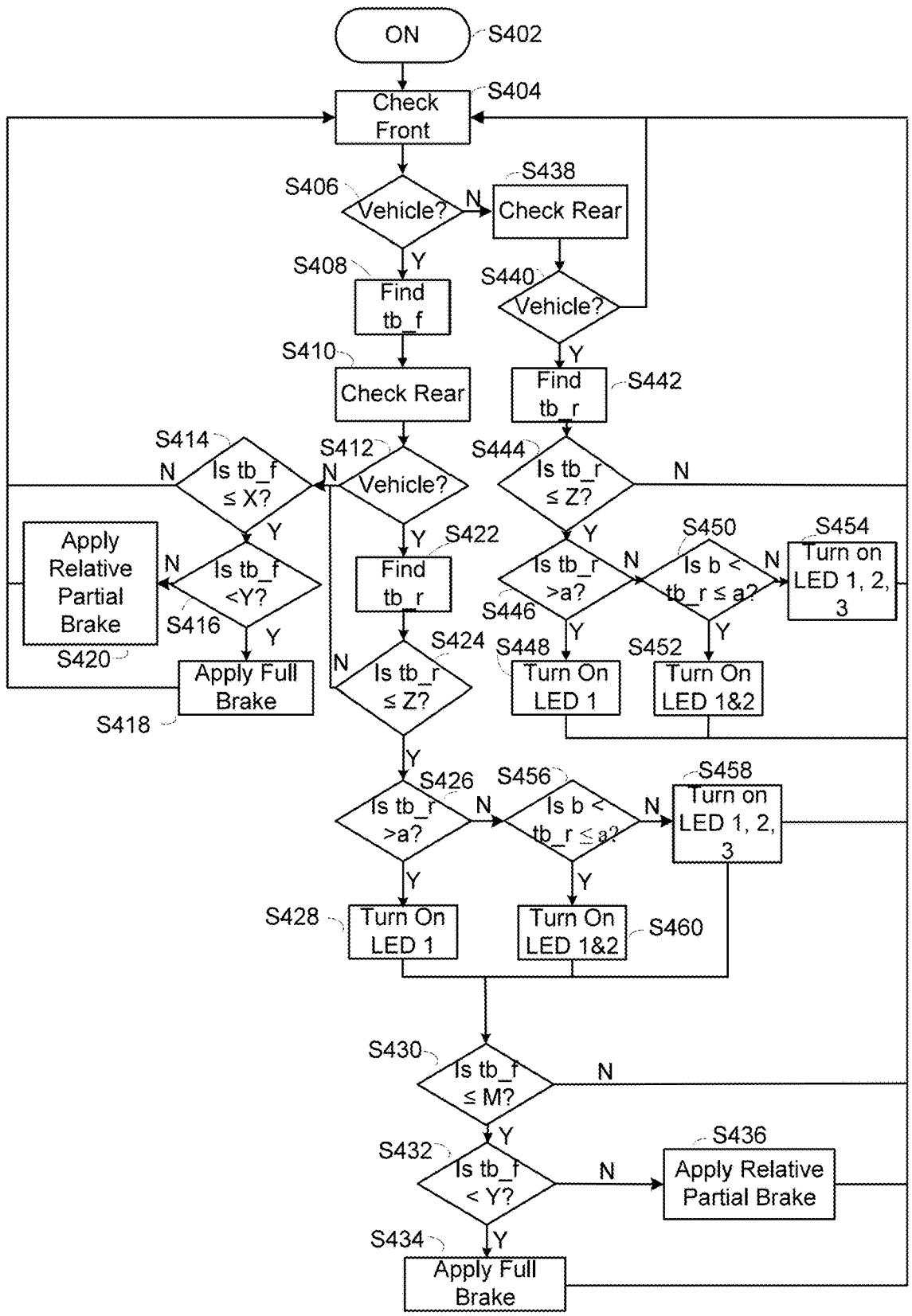
FIG. 4 is a system logic process diagram.

A flowchart of the DDAP system steps is shown in FIG. 4.

At S402, the DDAP turns on. The front LiDAR and rear LiDAR detectors take measurements of the distance of any obstacles or vehicles before or behind the subject vehicle respectively.

At S404, the path in front of the subject vehicle is measured by the front LiDAR detector. At S406, a positive measurement indicates there is a second vehicle in front. At S408, the time for braking before hitting the second vehicle, tb_f, is calculated. At S410, the rear of the subject vehicle is checked to determine whether there is a third vehicle at the rear. If YES, the time for braking by third vehicle, tb_r, is calculated. At S424, tb_r is compared with a threshold Z. If tb_r is less than or equal to Z, then tb_r is compared at S426 to determine whether it is less than a. If YES, LED 1 turns on at S428. If NO, then at S456 tb_r it is determined whether tb_r is greater than b but less than or equal to a. If YES, then LEDs 1 and 2 are turned on at S460. If NO, LEDs 1, 2 and 3 are turned on at S458 and the calculation returns to S404.

At S406, if there is no vehicle in front, the calculation checks the rear of the subject vehicle at S438. If it is determined that a vehicle is detected at S440, tb_r is determined, and the algorithm proceeds to compare tb_r through steps S442 to S454 to lower and higher thresholds a, b and Z in the same manner as steps S422 to S460 and then returns to S404.

At S412, if there is no rear vehicle, tb_f is compared at S414 to determine when it is less than or equal to threshold X. If NO, no changes are made and the process returns to S404. If YES, tb_f is compared to determine whether it is less than threshold Y. If YES, the DDAP system applies the full brake force at S418 to try to avoid a collision. If NO, then a partial brake is applied at S420 to slow the subject vehicle. The process then returns to S404.

At S424, if tb_r is not less than or equal to threshold Z, the process returns to S414.

At S430, the process checks whether tb_f is less than or equal threshold M. If NO, the process returns to S404. If YES, S432 determines is tb_f is less than threshold Y. If YES, the full brake is applied at S434 and the process returns to S404. If NO, a partial brake is applied at S436 and the process returns to S404.

The thresholds Z, X, Y, M and "a", "b" and their values are related by X>Y, X>M, Z>a>b, and X>Z. The thresholds are in units of time (seconds) as related to the time before a collision and are calculated by the processor depending on the speed of the vehicles. In a non-limiting example, X=15 s, Y=10 s, Z=10 s, M=10 s, a=7 s and b=5 s.

Testing was performed to verify the correct operation of the DDAP system. Theoretical results were then compared with experimental data.

Four tests are performed. Test 1 verifies the correct installation of the mechanism. Tests 2-4 test the code logic.

Figure 5A:
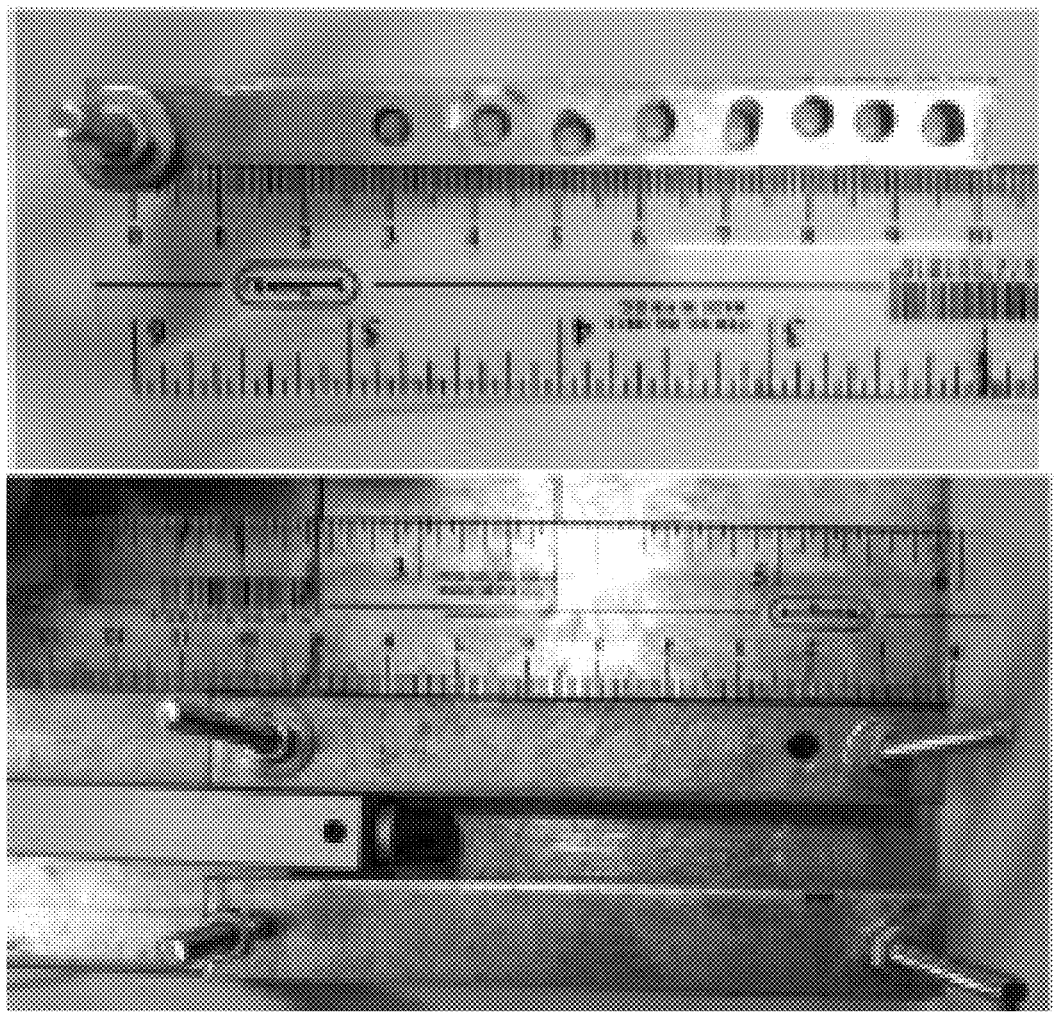
FIG. 5A illustrates the part measuring device.
Figure 5B:
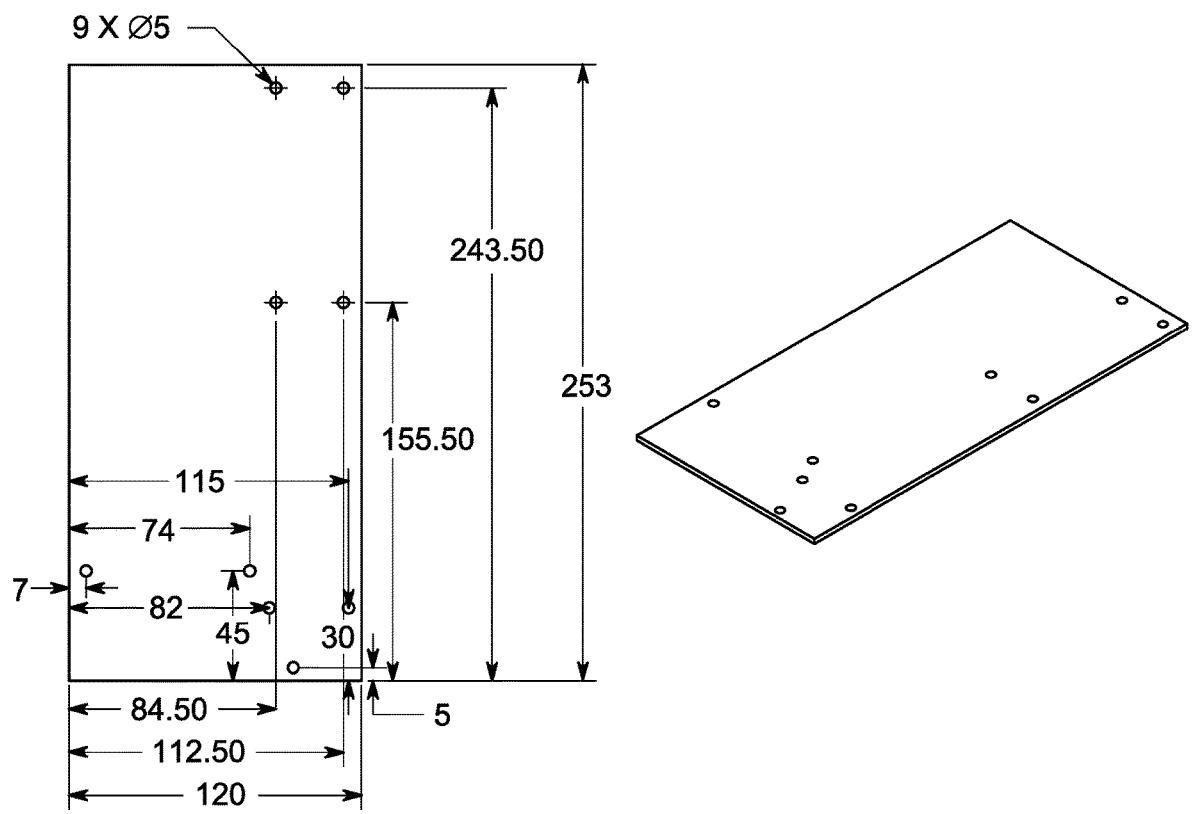
FIG. 5B illustrates the installation of the DDAP.
Figure 5C:
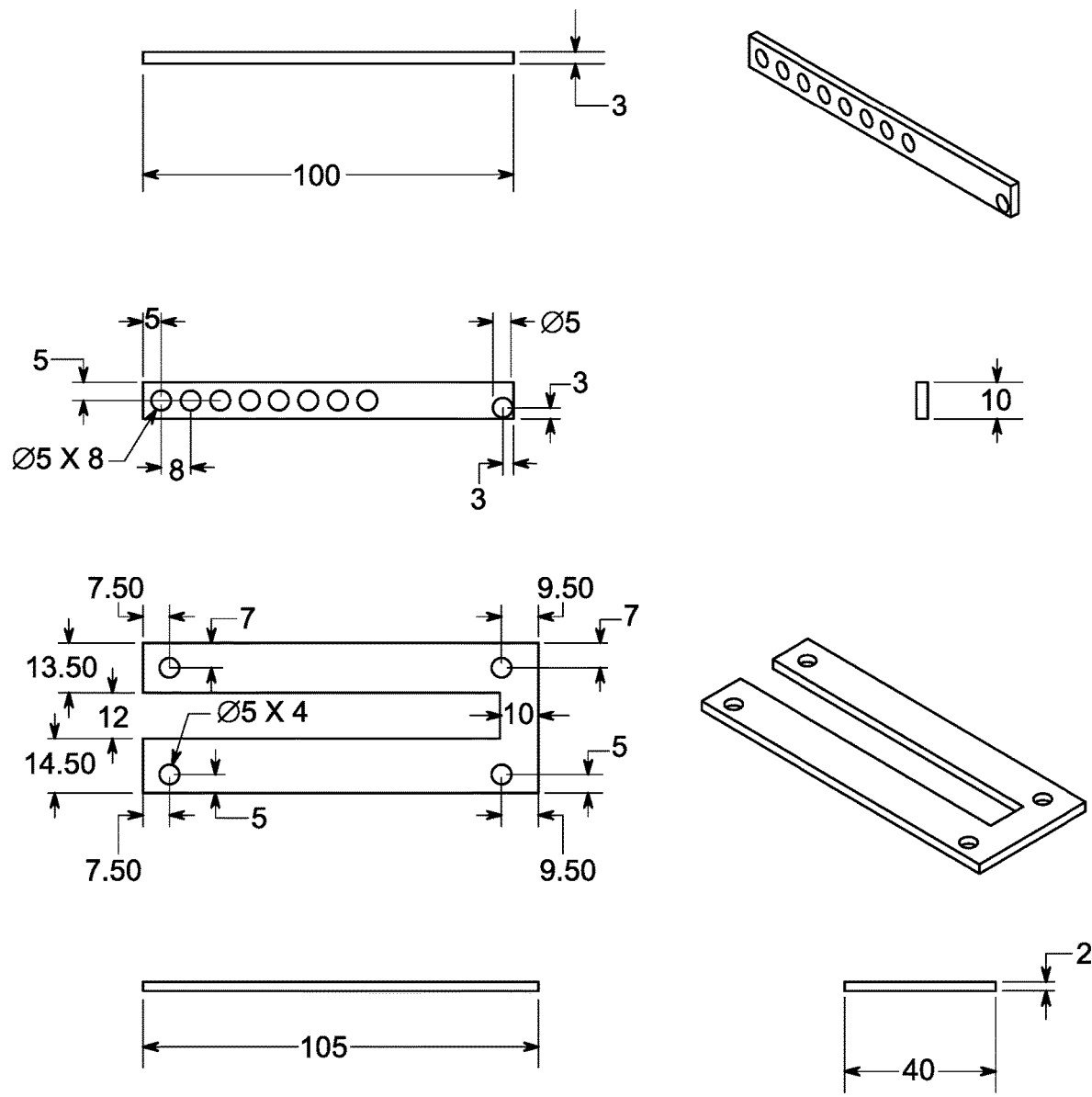
FIG. 5C illustrates the schematic of the base of the DDAP.

Test 1 includes measuring the manufactured adjustable plate and the plate path to verify that the measurements comply with the 2D drawings measurements to ensure that the parts are correctly fabricated as shown in FIG. 5A, which illustrates the precision measurement. This test verified that the manufactured parts matched the exact length of the CAD designs of FIGS. 5B and 5C. As each vehicle has a different brake pedal extendable limit, a longer or shorter linear motor stroke is needed for each vehicle type.

Figure 5D:
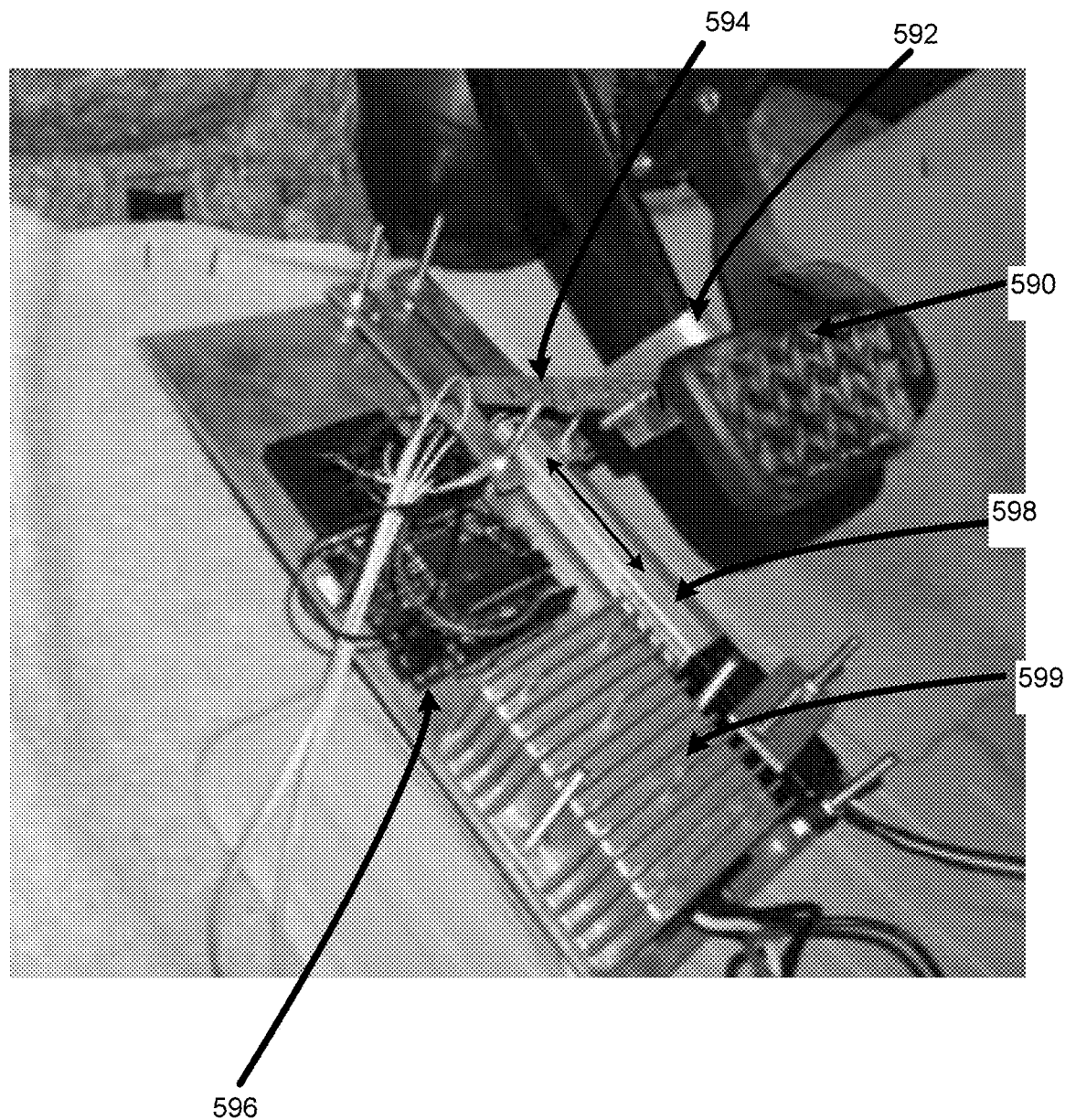
FIG. 5D illustrates the schematic of the adjustable plate and plate path.
Figures 5E, 5F, 5G:
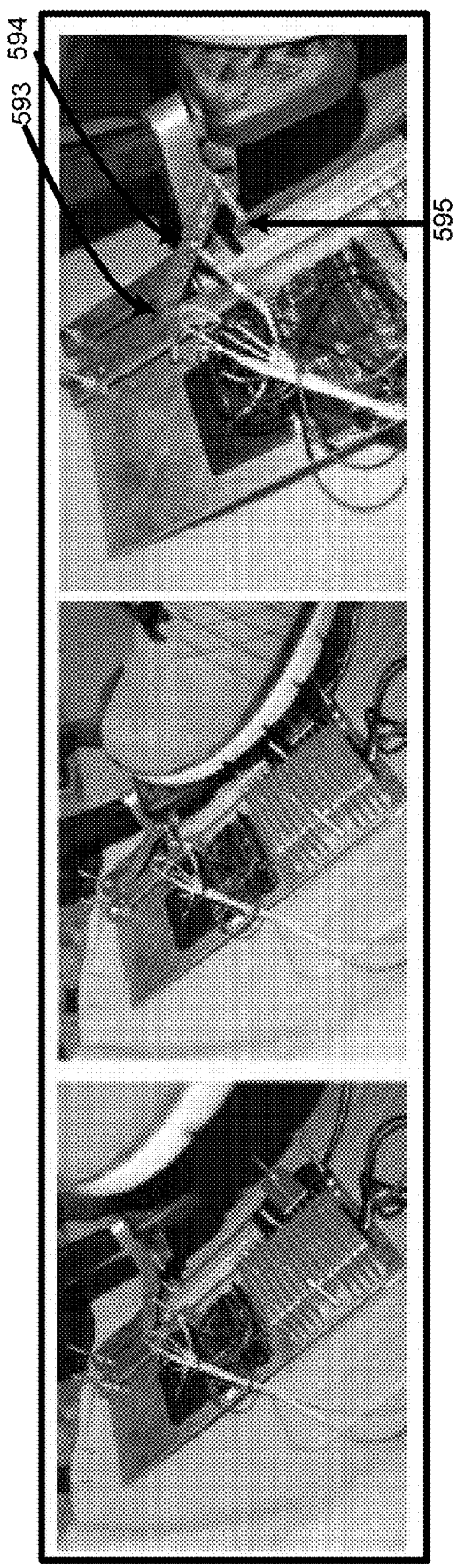
FIG. 5E illustrates the normal brake pedal position of the DDAP.
FIG. 5F illustrates partial braking by the DDAP.
FIG. 5G illustrates maximum braking by the DDAP.

The installation of the circuit board 596 to the vehicle is behind the brake pedal 590 as shown in FIG. 5D with the brake pedal holder 592 extending an adjustable plate 598 to the braking length needed (shown by bidirectional arrow, FIG. 5D), also, the installation of the front and rear LiDAR devices. The mechanical aspects of the DDAP were found to work as expected. FIGS. 5D, 5E, and 5F depict the brake pedal at the normal, uncontrolled position (5D), at the partial braking position (5E) and at the full braking position (5F) where control is taken from the driver and the brake is fully operated by the DDAP.

In one embodiment, braking is effectuated by controlling the brake pedal 590 inside the driver's side of the passenger compartment of the vehicle, as shown in FIG. 5D-5G. In this embodiment, the brake pedal 590 is preferably connected to a lever arm 594 which is connected to a linear advance mechanism 598 that is flatly disposed on the surface of the floorboard of the vehicle. The lever alarm 594 is attached at one end to brake arm collar 592 by pins 595 and at the other end to the linear advancement mechanism 598 so that forward and back movement of the linear advance mechanism raises and/or lowers the brake pedal. The lever arm 594 includes holes for registration with pins 595 for initial adjustment. Signals 335 (FIG. 3A) from the circuit board 596 to an advancement mechanism (such as a stepper motor, not shown) function to advance the mechanism within the linear mount thereby applying or releasing brake pressure to the braking system of the vehicle.

The advancement mechanism is a motor located within housing 599 (see FIG. 5D). In a non-limiting example, the motor is a stepper motor. The stepper motor may be an SY20STH30-0604A(#1204) stepper motor, which is manufactured by Pololu Corporation, 920 Pilot Rd., Las Vegas, Nev., USA.

However, the motor of the present disclosure is not limited to a stepper motor and may be any type of small motor capable of actuating the advancement mechanism.

Figure 6A:
FIG. 6A illustrates a test of a first vehicle with a second vehicle in front.
Figure 6B:
FIG. 6B illustrates a test of a first vehicle with a third vehicle at the rear.

Test 2 is used to verify the logic of the C++ code, in which the DDAP system is tested for the case of a second vehicle 630 in front of the first vehicle 620 without a third rear vehicle as shown in FIG. 6A. The logic controller sends control signals to the motor to initiate partial braking when the first vehicle enters the action zone which is between 5 and 10 seconds. If the time for braking (Tb) reaches or passes the maximum time for braking, the controller should extent the full stroke of the motor in order to avoid an accident or minimize damage Test 3 verifies the logic of the C++ code in the situation where there is a third rear vehicle 640 only as shown in FIG. 6B. The logic controller should send control signals to the LEDs on the board depending on the range of distance between the first vehicle 620 and a third rear vehicle 640 where the first LED indicates the farthest distance (time for braking) and the other three LEDs indicate consecutive smaller distances (smaller braking times).

Figure 6C:
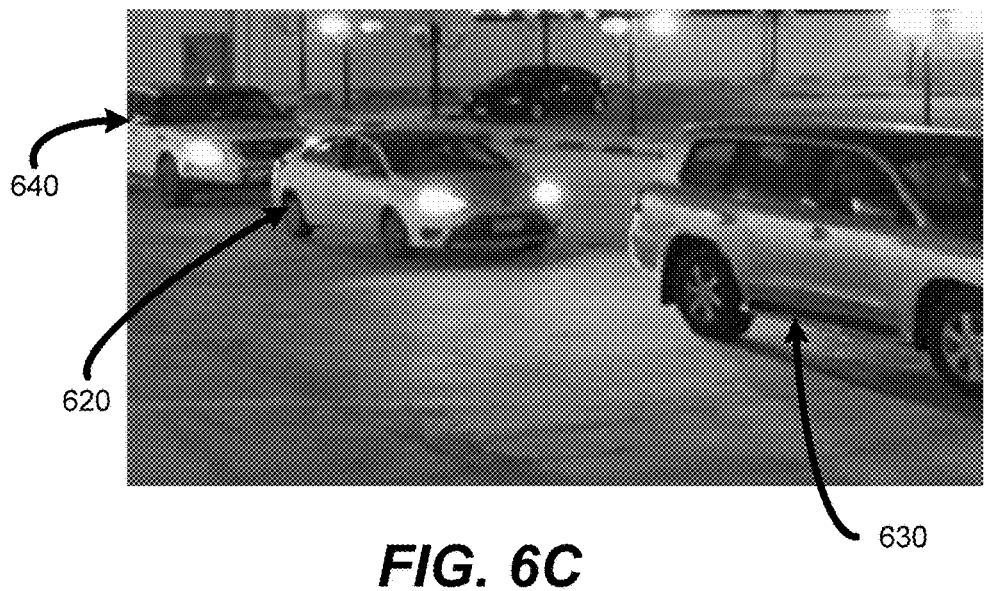
FIG. 6C illustrates a test of a first vehicle with a second vehicle in front and a third vehicle at the rear.

Test 4 verifies the logic of the C++ code in the situation where there are both front 630 and rear 640 vehicles is shown in FIG. 6C. The logic controller should calculate the distance between the second front vehicle 630 and the third rear vehicle 640. If the third rear vehicle is approaching the first vehicle, the LED indicators should all light up and the controller should delay the action of the motor to an amount not exceeding the maximum time for braking.

For the three logic tests, the LiDAR readings were averaged every second (10 readings) to compensate the point cloud scattered measurements and to decrease the amount of time spent running the code comparisons.

Figure 7:
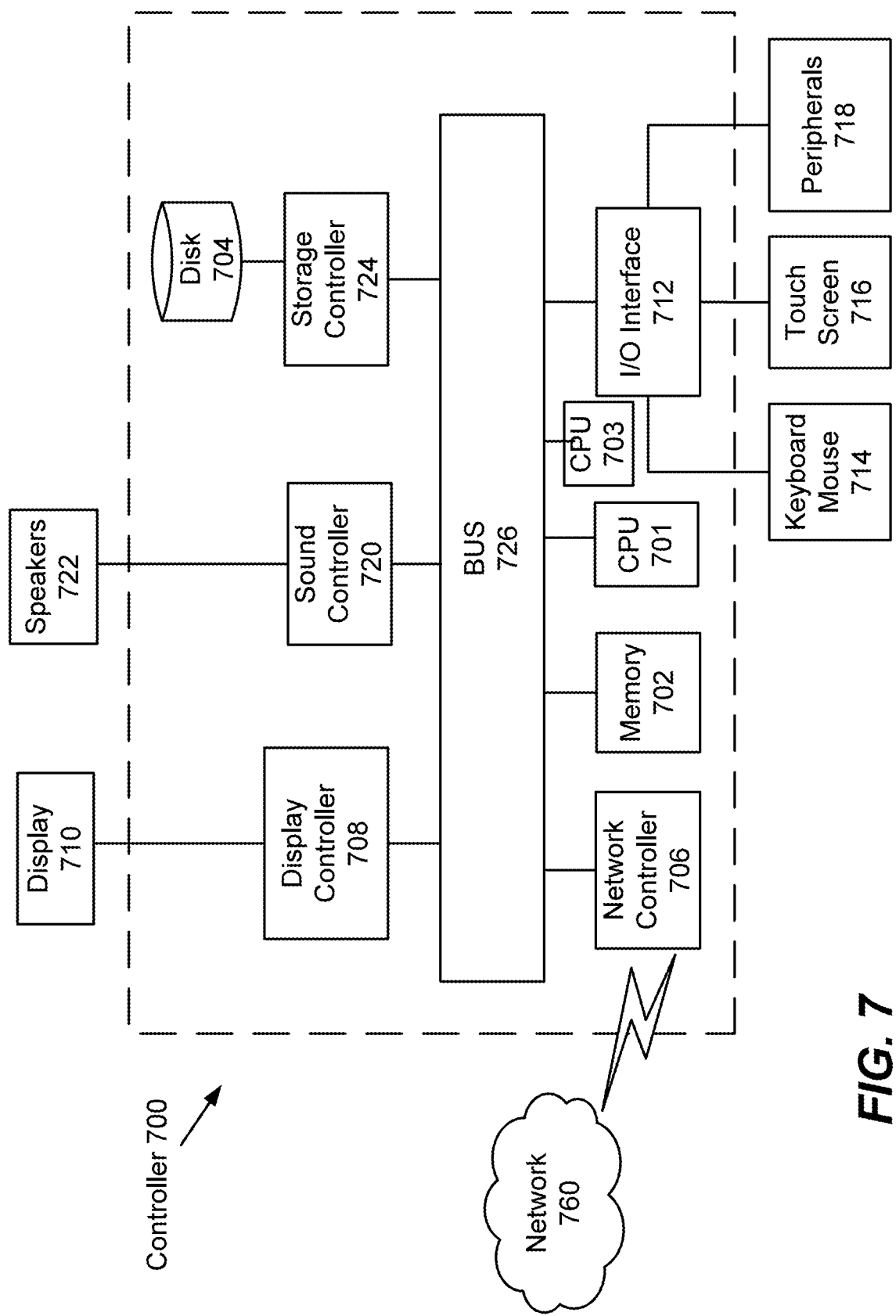
FIG. 7 is an illustration of a non-limiting example of details of computing hardware used in the computing system, according to certain embodiments.

Next, further details of the hardware description of the computing environment of that may be used by the microcontroller and software (shown in the previous non-limiting example as an Arduino UNO board and IDE (Integrated Development Environment) software) according to exemplary embodiments is described with reference to FIG. 7. In FIG. 7, a controller 700 is described is representative of the system 300 of FIG. 3 in which the controller is a computing device which includes a CPU 701 which performs the processes described above/below. The process data and instructions may be stored in memory 702. These processes and instructions may also be stored on a storage medium disk 704 such as a hard drive (HDD) or portable storage medium or may be stored remotely.

Further, the claimed embodiments described herein are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the embodiments described herein may be provided as a utility application, background daemon, or component of an operating system, or combination thereof, executing in conjunction with CPU 701, 703 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 701 or CPU 703 may be a Xenon or Core processor from Intel of America or an Opteron processor from AMD of America, or may be other processor types that would be recognized by one of ordinary skill in the art. Alternatively, the CPU 701, 703 may be implemented on an FPGA, ASIC, PLD or using discrete logic circuits, as one of ordinary skill in the art would recognize. Further, CPU 701, 703 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN subnetworks. The network 760 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 708, such as a NVIDIA GeForce GT7 or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster X-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
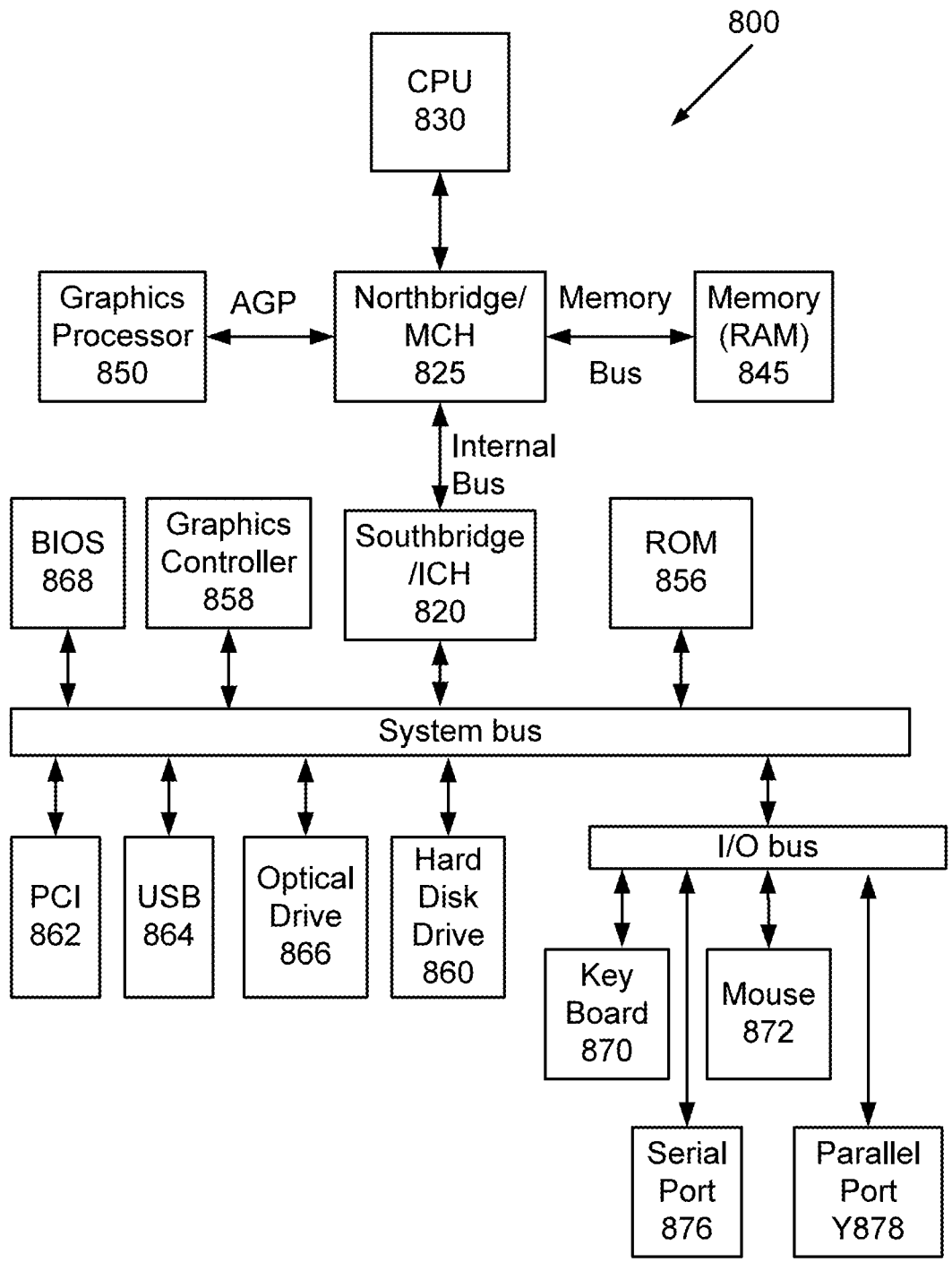
FIG. 8 is an exemplary schematic diagram of a data processing system used within the computing system, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
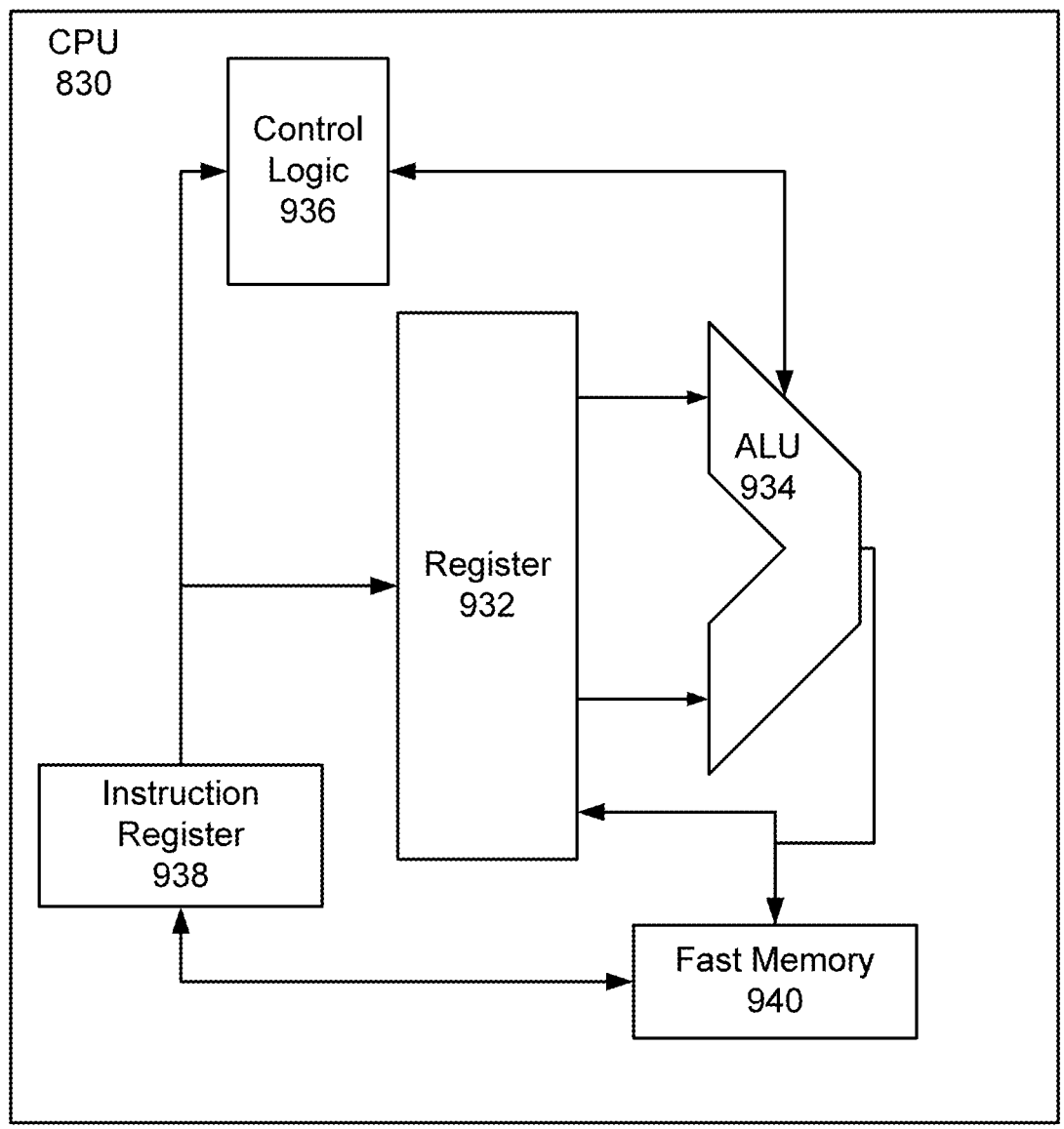
FIG. 9 is an exemplary schematic diagram of a processor used with the computing system, according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 10:
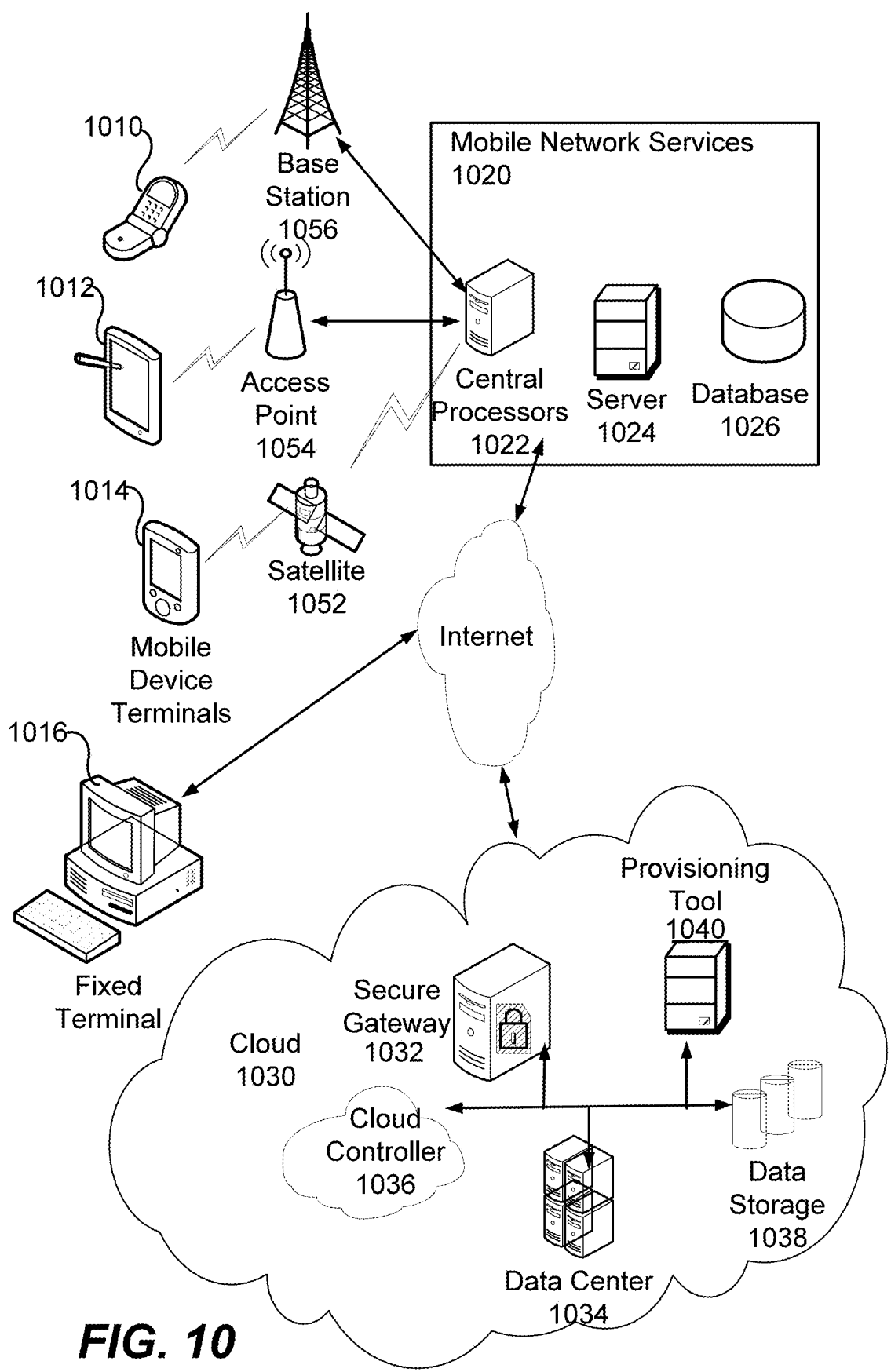
FIG. 10 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 10, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A dual direction accident prevention (DDAP) system for a first vehicle, the DDAP comprising:
 a dual direction rate of approach monitor (DDRA) including a front rate of approach monitor (FRAM) and a rear rate of approach monitor (RRAM);
 a plurality of front light detection and ranging (LiDAR) detectors connected to a front grill of the first vehicle at a position above a front license plate, wherein the plurality of front LiDAR detectors are each configured to detect whether there is a second vehicle in front of the first vehicle and, when the second vehicle is detected, measure a first set of consecutive distances to the second vehicle and transmit the first set of consecutive distances to the DDRA;
 a plurality of rear LiDAR detectors connected to a rear bumper of the first vehicle at a position below a rear license plate, wherein the plurality of rear LiDAR detectors are each configured to detect whether there is a third vehicle behind the first vehicle and, when a third vehicle is detected, measure a second set of consecutive distances to the third vehicle and transmit the second set of consecutive distances to the DDRA;

wherein the dual direction rate of approach monitor is configured to receive the first set of consecutive distances and the second set of consecutive distances, transmit the first set of consecutive distances to the FRAM and transmit the second set of consecutive distances to the RRAM;

wherein the FRAM is configured to monitor and calculate in near-real time both a first distance, df, of the second vehicle from the front grill of the first vehicle, and a front rate of approach, vr_f, of the front grill of the first vehicle towards the second vehicle; and wherein the RRAM is configured to monitor and calculate in near-real time both a second distance, dr, of the third vehicle from the rear bumper of the first vehicle, and a rear rate of approach, vr_r, of the third vehicle towards the rear bumper of the first vehicle;

an assistive braking processor configured to receive the front rate of approach calculations and the rear rate of approach calculations in parallel and near-simultaneously from the FRAM and the RRAM, correlate the calculations, and generate a first braking signal;

an assistive braking controller configured to receive the first braking signal and apply a first braking force to a brake pedal actuator when the front rate of approach of the first vehicle towards the second vehicle is greater than a first braking threshold, wherein the first braking force is based on both a remaining distance between the first vehicle and the second vehicle, and the rear rate of approach, vr_r, of the third vehicle;

wherein the assistive braking processor is further configured to determine when the first vehicle cannot avoid an impact with the second vehicle and send a second braking signal to the assistive braking controller to increase the first braking force to a second braking force, greater than the first braking force, to minimize an impact with the second vehicle; and wherein the DDRA is further configured to send a bracing signal to a vehicle controller to brace the first vehicle in preparation for the impact with the second vehicle.

2. The DDAP system of claim 1, wherein the bracing signal includes tightening a seatbelt and applying secondary brakes, and one or more of, employing deploying at least one of an interior and an exterior airbag, activating an electromagnetic field on the bumper, dropping a side curtain airbag and dropping a rear curtain airbag.

3. The DDAP system of claim 1, wherein the second braking force is greater than the first braking force and the first braking force is partial braking and the second braking force is full braking.

4. The DDAP system of claim 1, further comprising wherein the assistive braking processor is further configured to correlate four different inputs to control the braking when the RRAM detects a third vehicle approaching from behind the first vehicle and the first vehicle is approaching the second vehicle, wherein the four different inputs are (i) the distance between the front of the first vehicle and the rear of the second vehicle, df, (ii) the distance between the rear of the first vehicle and the front of the third vehicle, dr, (iii) the front rate of approach, vr_f, of the first vehicle towards the second vehicle and (vi) the rear rate of approach, vr_r, of the third vehicle towards the first vehicle.

5. The DDAP system of claim 4,
wherein the assistive braking processor is configured for determining the force of the automatic braking for the first vehicle to avoid collision with the second vehicle while reducing the danger that the third vehicle will collide with the rear of the first vehicle.

6. The DDAP system of claim 5, further comprising:
wherein the assistive braking controller is further configured to determine when the rate of approach of the third vehicle is greater than a second braking threshold, and apply the force of the automatic braking for the first vehicle to avoid collision with the second vehicle and signal the vehicle controller to brace the first vehicle to withstand impact from the third vehicle, wherein bracing the first vehicle includes tightening the seatbelts of a driver and passengers of the first vehicle, deploying at least one of an interior and an exterior airbag dropping a side curtain airbag and dropping a rear curtain airbag.

7. The DDAP system of claim 6, wherein the bracing the first vehicle to withstand impact from the third vehicle further includes applying secondary brakes, and activating an electromagnetic field on the bumper.

8. The DDAP system of claim 1, further comprising;
wherein the assistive braking processor is further configured determining to determine the front rate of approach, vr_f, by dividing the difference between two consecutive distance readings of df, by an amount of time between the two consecutive distance readings; and to determine the rear rate of approach, vr_r, by dividing the difference between two consecutive distance readings of dr, by the amount of time between the two consecutive distance readings.

9. The DDAP system of claim 8, wherein the assistive braking processor is further configured for determining a time of braking, tb_f, to avoid the impact with the second vehicle by dividing a current reading of df by a previous calculation of the front rate of approach, vr_f, and comparing the time of braking to the first braking threshold and the second braking threshold.

10. The DDAP system of claim 9, wherein the first braking threshold is greater than the second braking threshold.

11. The DDAP system of claim 10, further comprising:
the assistive braking processor is further configured to determine the braking force, such that:
when tb_f is greater than the first braking threshold, the braking force is zero;
when tb_f is less than or equal to the first braking threshold and greater than the second threshold, the assistive braking controller applies partial braking; and
when tb_f is less than or equal to the second braking threshold, the assistive braking controller applies full braking.

12. The DDAP system of claim 8, further comprising:
the assistive braking processor is further configured for determining a time of braking to avoid a collision by the third vehicle, tb_r, by dividing a current reading of dr by a previous calculation of the rear rate of approach, vr_r, and comparing the time of braking to the first braking threshold and a second braking threshold.

13. A method of dual direction accident prevention (DDAP), comprising:
detecting, by a plurality of front light detection and ranging (LiDAR) detectors connected to a front grill of the first vehicle at a position above a front license plate, whether there is a second vehicle in front of the first vehicle and, when the second vehicle is detected, measuring a first set of consecutive distances to the second vehicle and transmitting the first set of consecutive distances to a dual direction rate of approach monitor (DDRA);

detecting, by a plurality of rear LiDAR detectors connected to a rear bumper of the first vehicle at a position below a rear license plate, whether there is a third vehicle behind the first vehicle and, when a third vehicle is detected, measuring a second set of consecutive distances to the third vehicle and transmitting the second set of consecutive distances to the DDRA;

receiving, by the DDRA, the first set of consecutive distances and the second set of consecutive distances, transmitting the first set of consecutive distances to the FRAM and transmitting the second set of consecutive distances to the RRAM;

monitoring in near-real time, by the FRAM, both a distance of a second vehicle from a front of a first vehicle, df, and calculating a front rate of approach of the front of the first vehicle towards the second vehicle, vr_f, based on the first set of consecutive distances;

monitoring, in near-real time, by the RRAM, both a distance of the third vehicle from a rear of the first vehicle, dr, and a rear rate of approach of the third vehicle towards the rear of the first vehicle, vr_r, based on the second set of consecutive distances;

receiving, by an assistive braking processor, the front rate of approach and the rear rate of approach determinations in parallel and near-simultaneously from the DDRA, correlating the determinations and generating a first braking signal;

receiving, by an assistive braking controller, the first braking signal and applying a first braking force to a brake pedal actuator when the front rate of approach of the first vehicle towards the second vehicle is greater than a first braking threshold, wherein the first braking force is based on both a remaining distance between the first vehicle and the second vehicle, and the rear rate of approach of the third vehicle;

determining, by the assistive braking processor, when the first vehicle cannot avoid an impact with the second vehicle and sending a second braking signal to the assistive braking controller to increase the first braking force to a second braking force, greater than the first braking force, to minimize an impact with the second vehicle; and sending a bracing signal to a vehicle controller to brace the first vehicle in preparation for the impact with the second vehicle.

14. The method of dual direction accident prevention of claim 13, further comprising:

determining, by the assistive braking processor, whether the rear rate of approach of the third vehicle towards the first vehicle is greater than a second braking threshold, wherein the first braking threshold is greater than the second braking threshold;

sending a signal to the assistive braking controller to apply the second braking force to minimize the impact with the second vehicle while bracing a driver and passengers of the first vehicle to withstand an impact from the third vehicle, wherein bracing includes tightening a seatbelt and applying secondary brakes, tightening a seatbelt, and one or more of deploying an interior and an exterior airbag, employing an electromagnetic fields on a bumper, dropping a side curtain airbag and dropping a rear curtain airbag.

15. A non-transitory computer readable medium having instructions stored therein that, when executed by one or more processors, cause the one or more processors to perform a method of dual direction accident prevention (DDAP), comprising:

detecting, by a plurality of front light detection and ranging (LiDAR) detectors connected to a front grill of the first vehicle at a position above a front license plate, whether there is a second vehicle in front of the first vehicle and, when the second vehicle is detected, measuring a first set of consecutive distances to the second vehicle and transmitting the first set of consecutive distances to a dual direction rate of approach monitor (DDRA);

detecting, by a plurality of rear LiDAR detectors connected to a rear bumper of the first vehicle at a position below a rear license plate, whether there is a third vehicle behind the first vehicle and, when a third vehicle is detected, measuring a second set of consecutive distances to the third vehicle and transmitting the second set of consecutive distances to the DDRA;

receiving, by the DDRA, the first set of consecutive distances and the second set of consecutive distances, transmitting the first set of consecutive distances to the FRAM and transmitting the second set of consecutive distances to the RRAM;

monitoring in near-real time, by the FRAM, both a distance of a second vehicle from a front of a first vehicle, df, and calculating a front rate of approach of the front of the first vehicle towards the second vehicle, vr_f, based on the first set of consecutive distances;

monitoring, in near-real time, by the RRAM, both a distance of the third vehicle from a rear of the first vehicle, dr, and a rear rate of approach of the third vehicle towards the rear of the first vehicle, vr_r, based on the second set of consecutive distances;

receiving, by an assistive braking processor, the front rate of approach and the rear rate of approach determinations in parallel and near-simultaneously from the DDRA, correlating the determinations and generating a first braking signal;

receiving, by an assistive braking controller, the first braking signal and applying a first braking force to a brake pedal actuator when the front rate of approach of the first vehicle towards the second vehicle is greater than a first braking threshold, wherein the first braking force is based on both a remaining distance between the first vehicle and the second vehicle, and the rear rate of approach of the third vehicle;

determining, by the assistive braking processor, when the first vehicle cannot avoid an impact with the second vehicle and sending a second braking signal to the assistive braking controller to increase the first braking force to a second braking force, greater than the first braking force, to minimize an impact with the second vehicle; and sending a bracing signal to a vehicle controller to brace the first vehicle in preparation for the impact with the second vehicle.

16. The DDAP system of claim 1, wherein:

the front light detection and ranging (LiDAR) detectors include at least one eight beam LiDAR camera, wherein each eight beam LiDAR camera is configured to transmit each of the eight LiDAR light beams at different angles from an axis of the first vehicle towards the second vehicle; and the rear light detection and ranging (LiDAR) detectors include at least one other eight beam LiDAR camera, wherein each one other eight beam LiDAR camera is configured to transmit each of the eight LiDAR light beams at different angles from an axis of the first vehicle towards the third vehicle.

17. The method of dual direction accident prevention of claim 13, further comprising:
    detecting whether there is a second vehicle in front of the first vehicle by at least one eight beam LiDAR camera mounted on the front grill, wherein each eight beam LiDAR camera transmits each of the eight LiDAR light beams at different angles from an axis of the first vehicle towards the second vehicle; and
    detecting whether there is a third vehicle behind the first vehicle by the rear light at least one other eight beam LiDAR camera mounted on the rear bumper, wherein each one other eight beam LiDAR camera is configured to transmit each of the eight LiDAR light beams at different angles from an axis of the first vehicle towards the third vehicle.

18. The non-transitory computer readable method of claim 15, further comprising:
    detecting whether there is a second vehicle in front of the first vehicle by at least one eight beam LiDAR camera mounted on the front grill, wherein each eight beam LiDAR camera transmits each of the eight LiDAR light beams at different angles from an axis of the first vehicle towards the second vehicle; and
    detecting whether there is a third vehicle behind the first vehicle by the rear light at least one other eight beam LiDAR camera mounted on the rear bumper, wherein each one other eight beam LiDAR camera is configured to transmit each of the eight LiDAR light beams at different angles from an axis of the first vehicle towards the third vehicle.

19. The non-transitory computer readable method of claim 15, further comprising:
    determining, by the assistive braking processor, whether the rear rate of approach of the third vehicle towards the first vehicle is greater than a second braking threshold, wherein the first braking threshold is greater than the second braking threshold;
    sending a signal to the assistive braking controller to apply the second braking force to minimize the impact with the second vehicle while bracing a driver and passengers of the first vehicle to withstand an impact from the third vehicle, wherein bracing includes tightening a seatbelt and applying secondary brakes, deploying an interior and an exterior airbag, activating an electromagnetic field on the bumper, dropping a side curtain airbag and dropping a rear curtain airbag.

* * * * *